Sept. 22, 1970  J. P. MAGNIN  3,530,435
TELEMETERING DECODER SYSTEM
Original Filed March 17, 1961  18 Sheets-Sheet 2
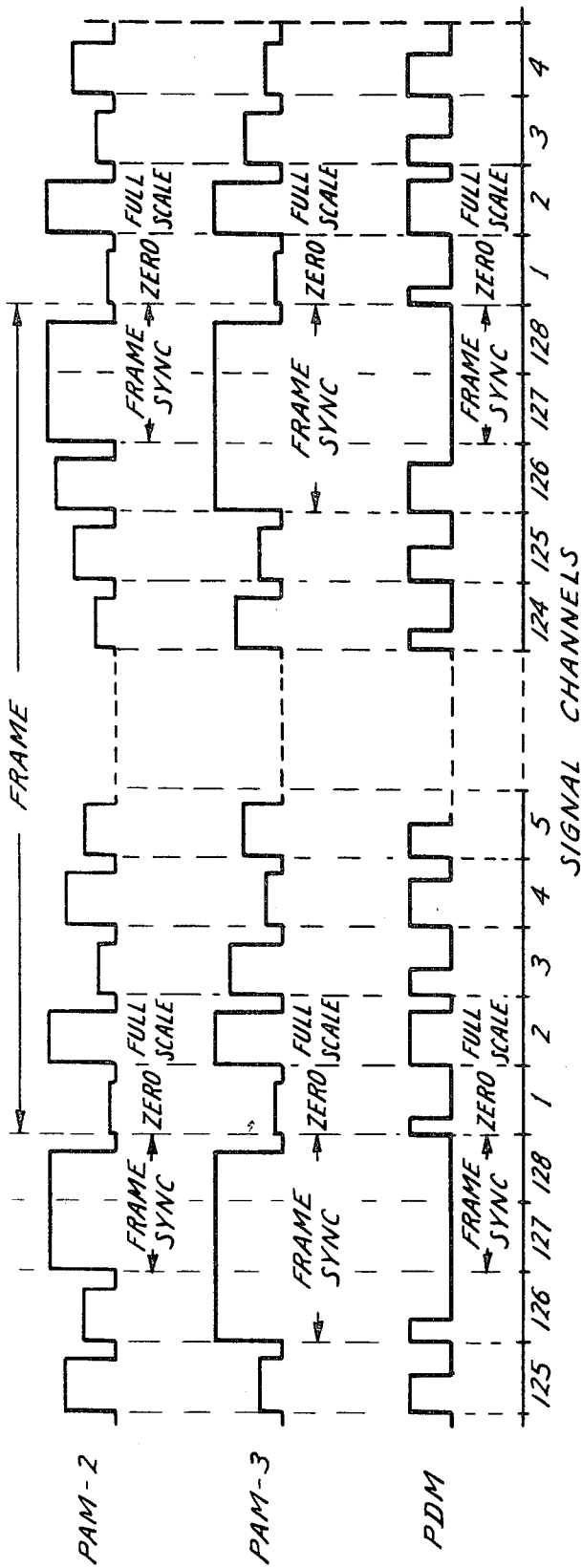
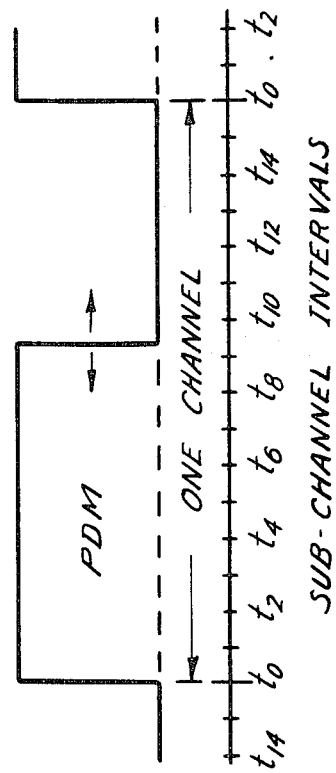
Jean Pierre Magnin
INVENTOR.
BY Richard E. Bee
ATTORNEY

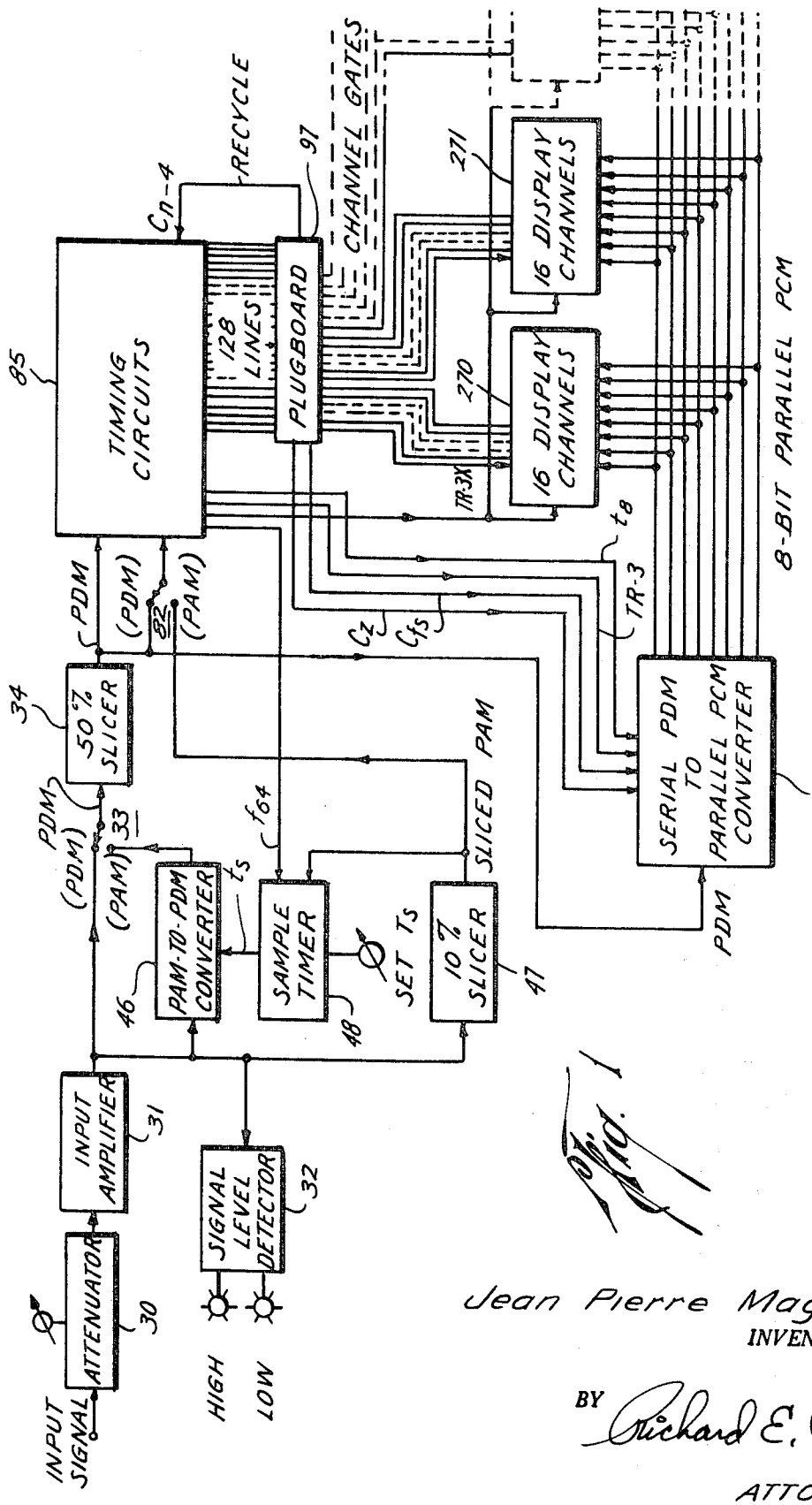

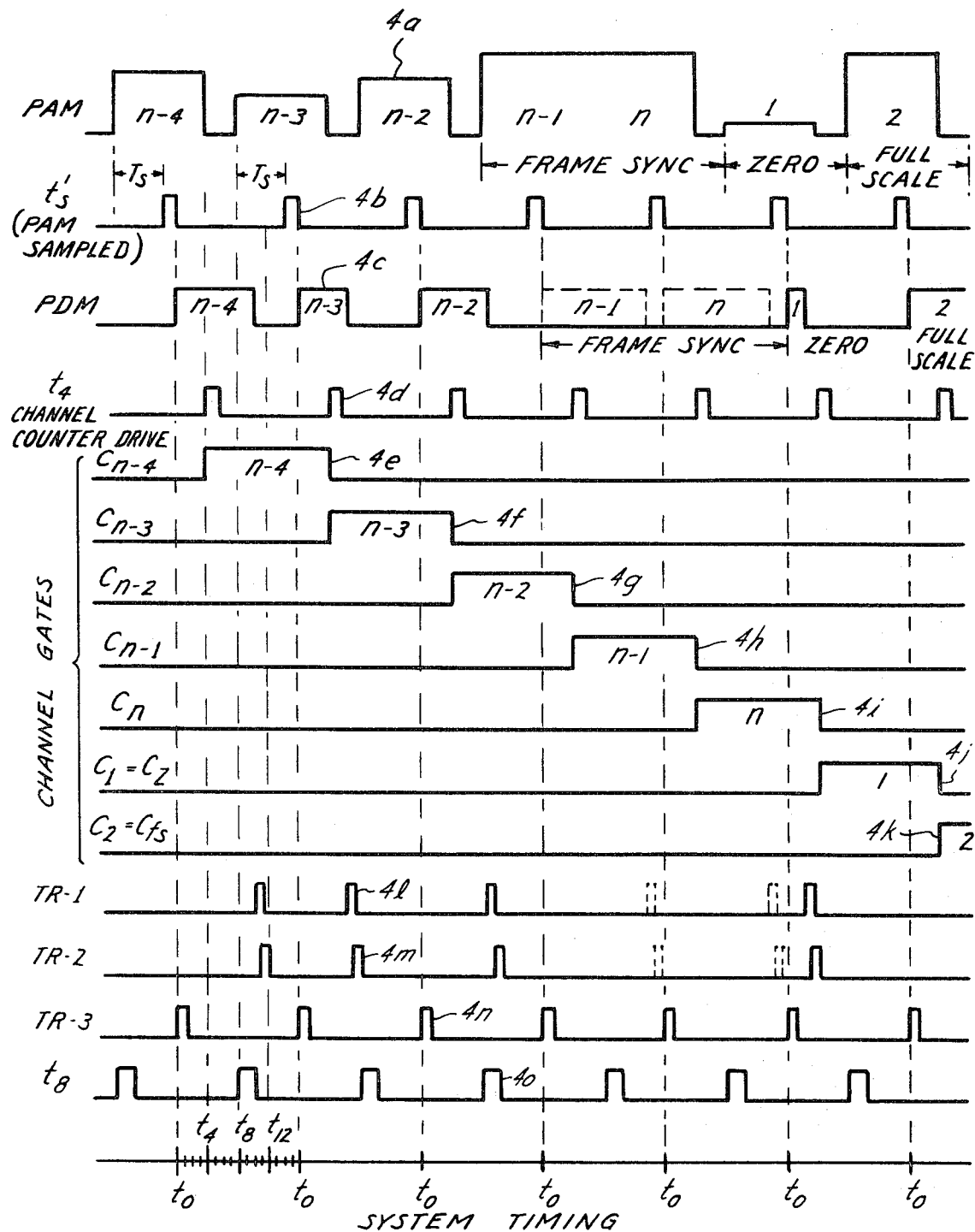

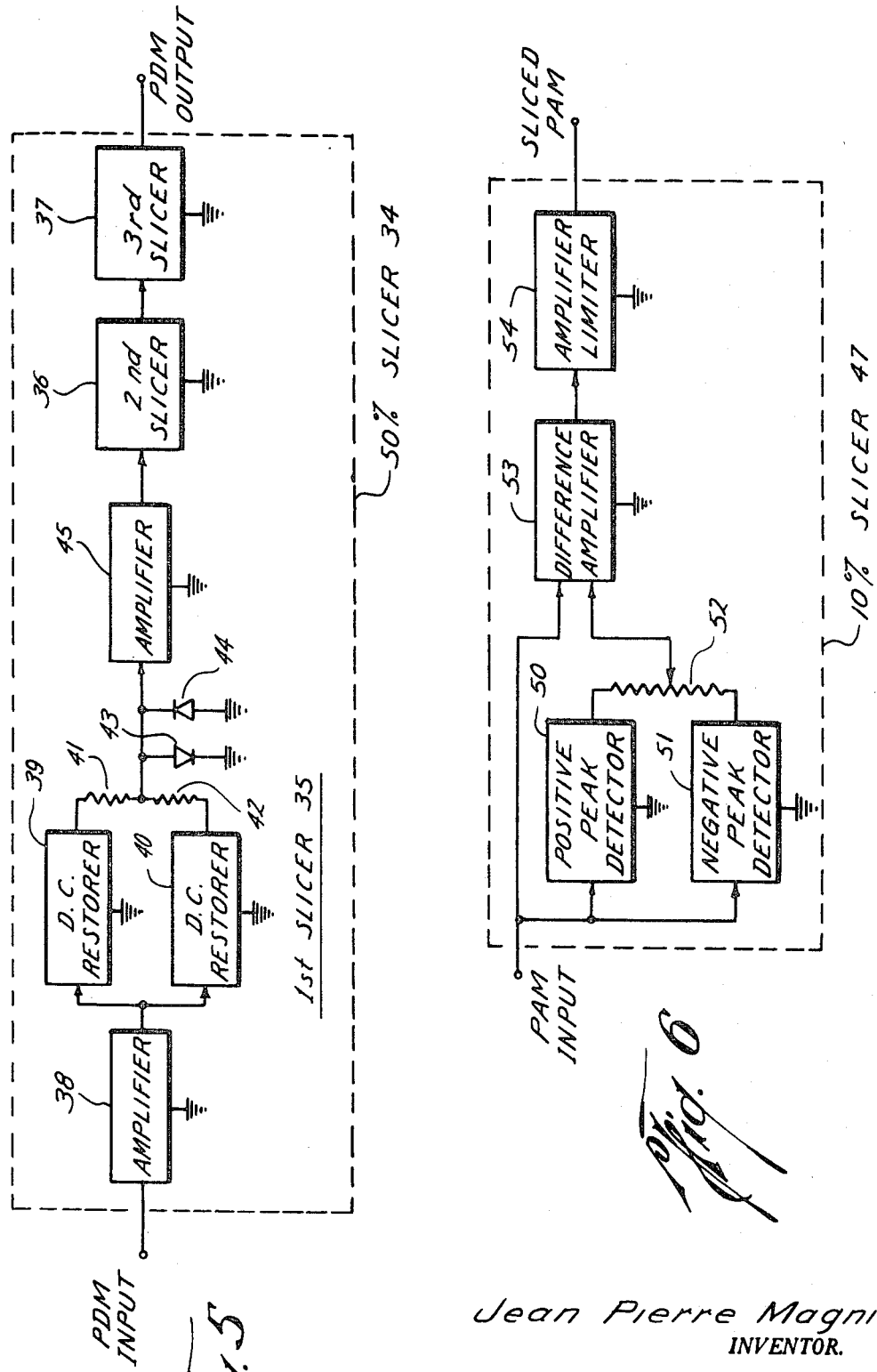

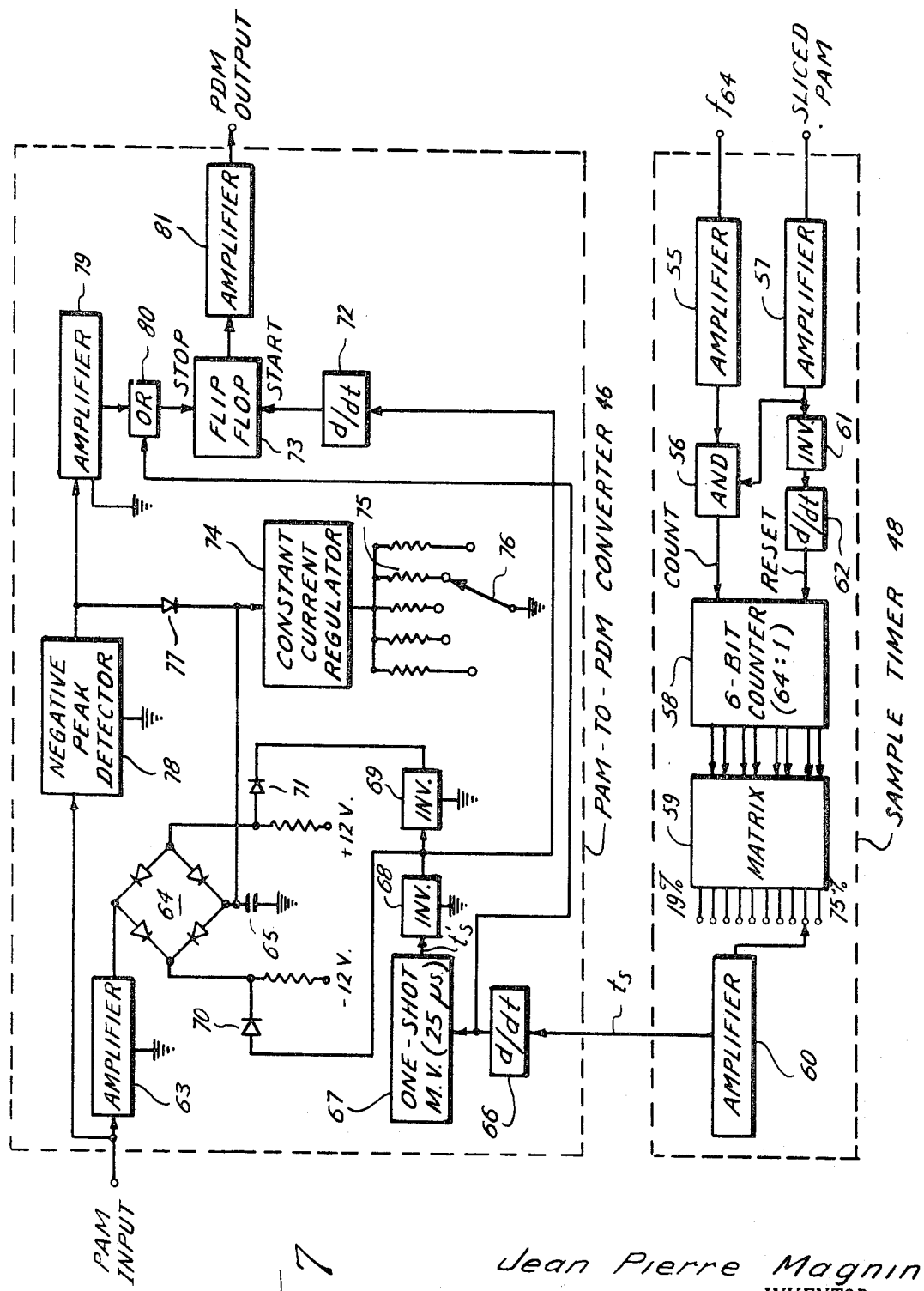

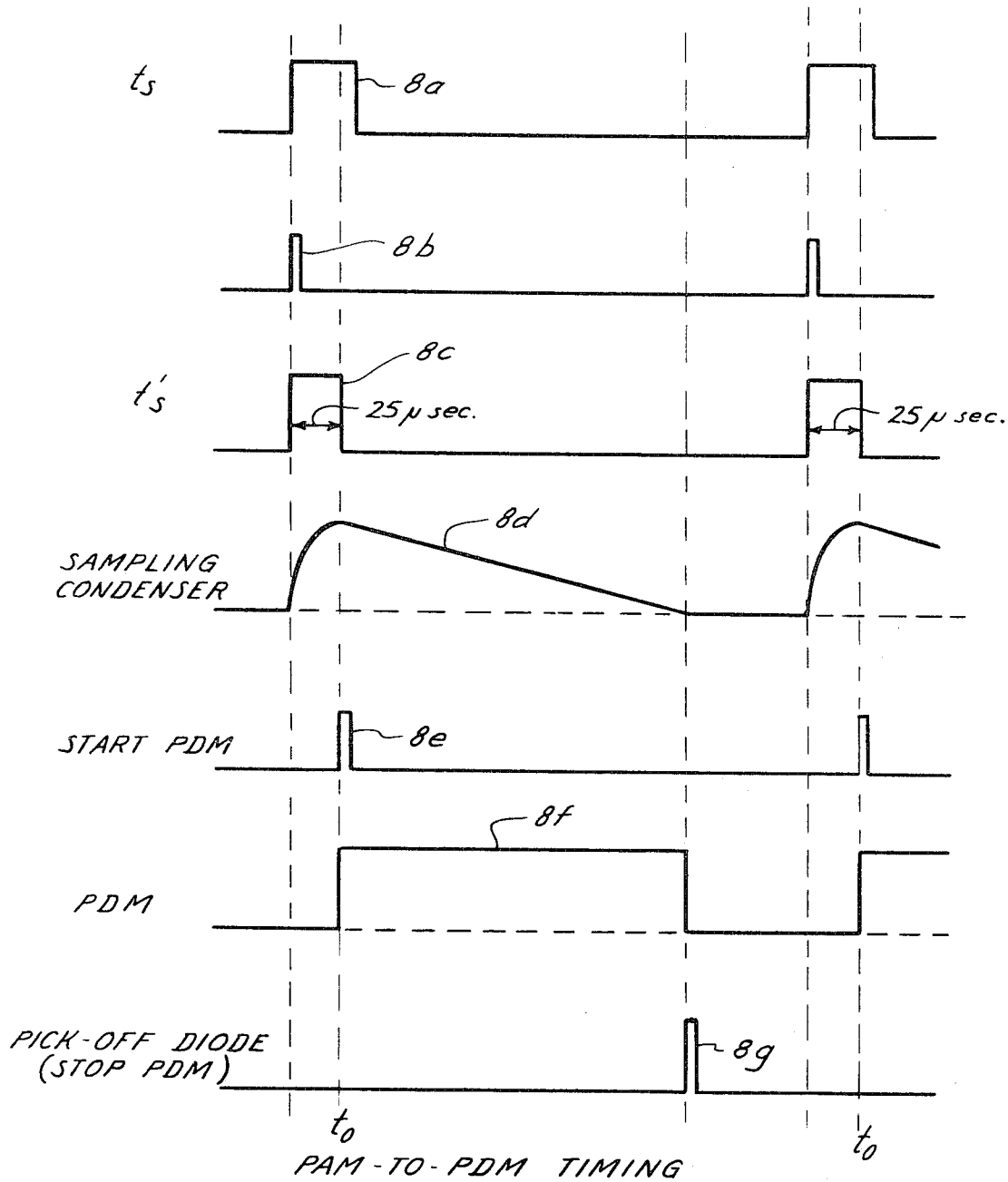

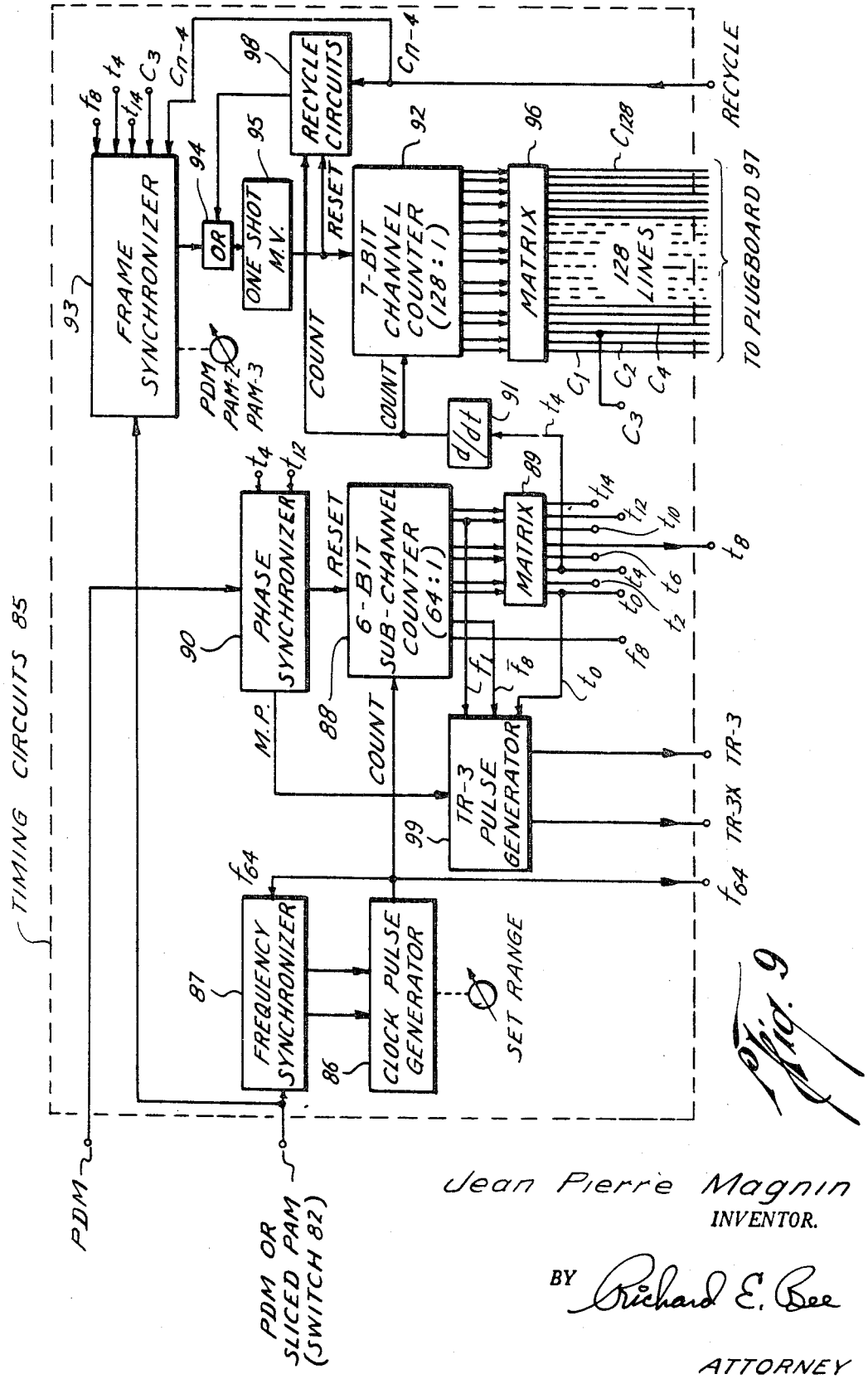

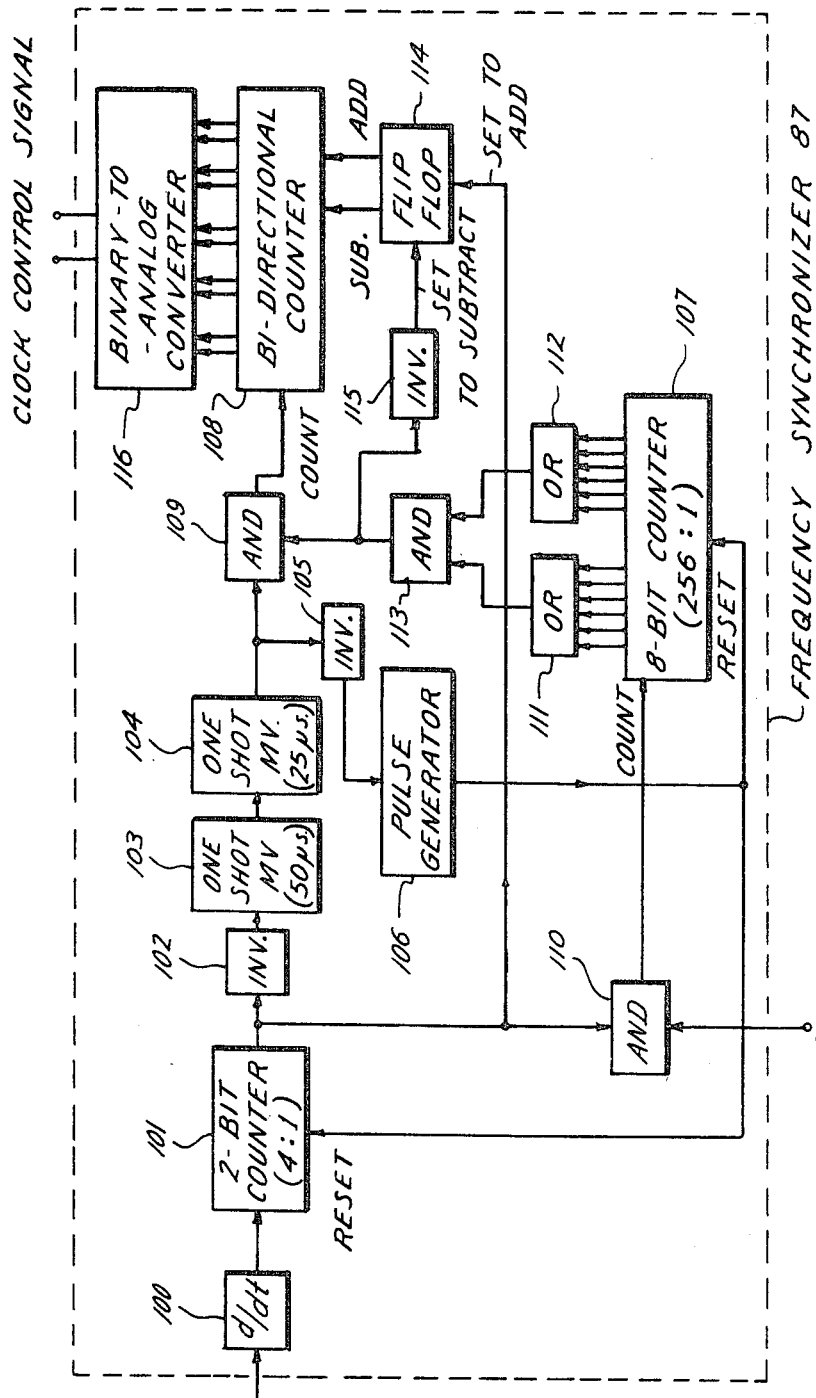

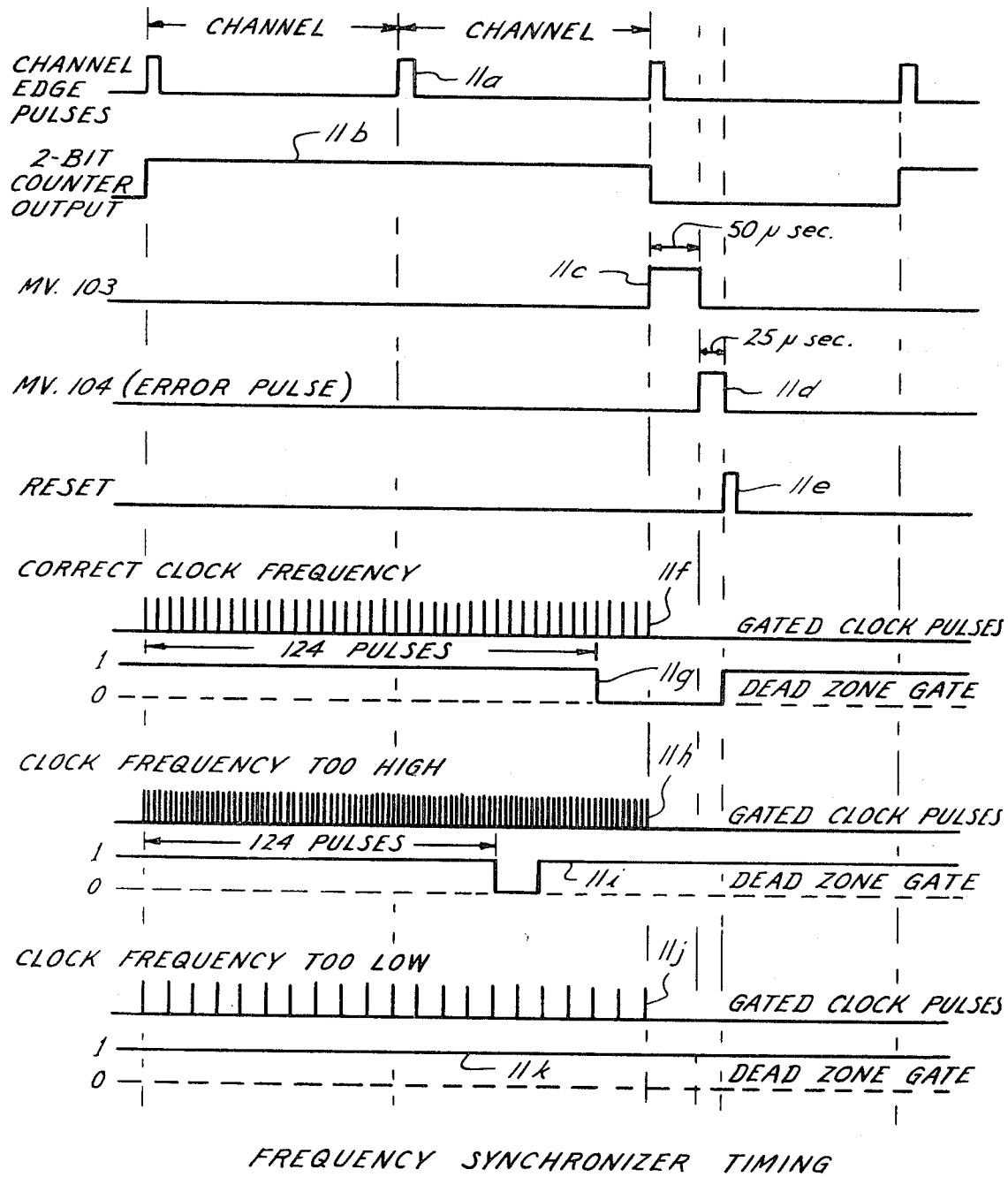
Fig. 11 — FREQUENCY SYNCHRONIZER TIMING

Sept. 22, 1970  J. P. MAGNIN  3,530,435
TELEMETERING DECODER SYSTEM
Original Filed March 17, 1961  18 Sheets-Sheet 10

PHASE SYNCHRONIZER TIMING

Jean Pierre Magnin
INVENTOR.

BY Richard E. Bee
ATTORNEY

Sept. 22, 1970          J. P. MAGNIN          3,530,435

TELEMETERING DECODER SYSTEM

Original Filed March 17, 1961          18 Sheets—Sheet 16

Jean Pierre Magnin
INVENTOR.

BY Richard E. Bee

ATTORNEY

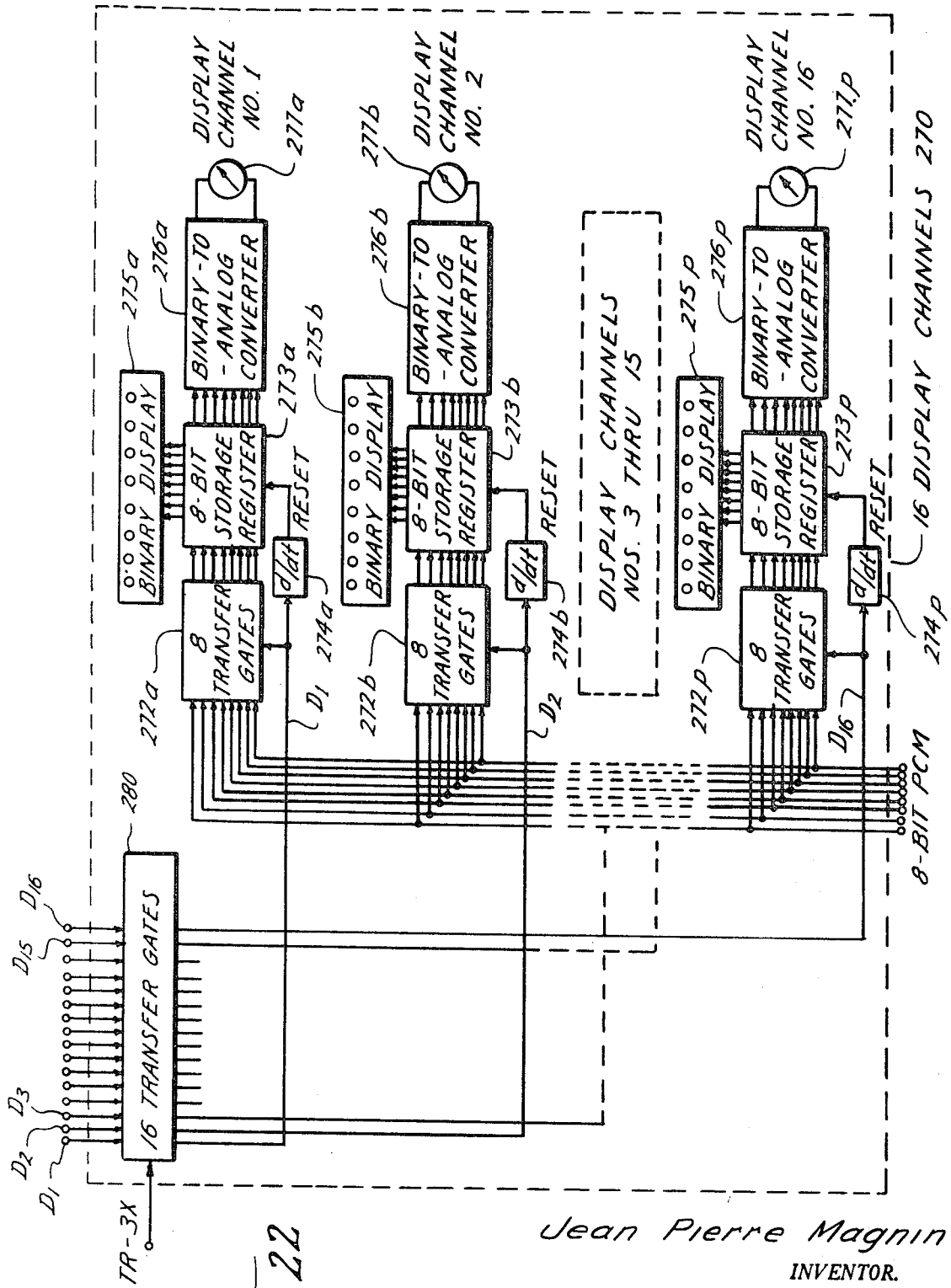

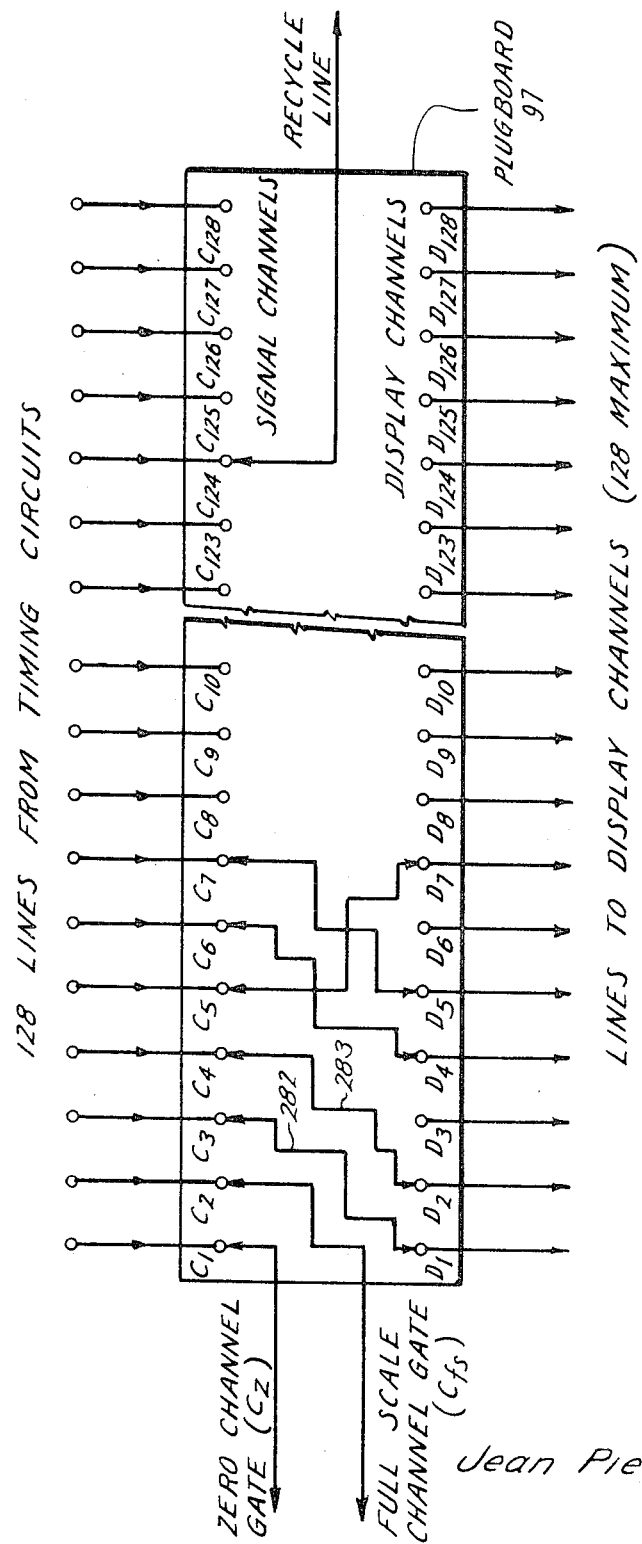

United States Patent Office 3,530,435
Patented Sept. 22, 1970

3,530,435
TELEMETERING DECODER SYSTEM
Jean P. Magnin, Sarasota, Fla., assignor, by mesne assignments, to Weston Instruments, Inc., Newark, N.J., a corporation of Delaware
Original application Mar. 17, 1961, Ser. No. 96,413, now Patent No. 3,377,585, dated Apr. 9, 1968. Divided and this application Nov. 1, 1966, Ser. No. 591,206
Int. Cl. H04q 9/00
U.S. Cl. 340—167                                18 Claims

ABSTRACT OF THE DISCLOSURE

In a telemetering decoder system for decoding a pulse train composed of repetitive cycles of time-multiplexed signal intervals where one signal interval of each cycle contains an indication of a full-scale signal value, there is included a counting circuit responsive to the pulse value during each signal interval for developing a plural-bit pulse code signal representative thereof and means for examining said pulse code signal and for adjusting the counting rate of the counting circuit if such signal departs from a predetermined full-scale value.

---

This application is a division of applicant's copending application Serial No. 96,413, filed on Mar. 17, 1961 for "Telemetering Decoder System" now Pat. No. 3,377,585.

This invention relates to telemetering decoder systems, and particularly, to decoder systems for decoding time-multiplexed pulse signals.

In presently known telemetering systems, various types of signal multiplexing techniques are utilized to enable the transmission of a number of different information channels over a single common wire line or radio link. One commonly used multiplexing technique is known as "time division multiplexing." In a time division multiplex system, the transmitting equipment includes encoder apparatus which samples the information in the different signal channels in a cyclic sequence and puts out a pulse, or group of pulses, for each channel. Each pulse or pulse group is modulated in accordance with the information in that channel. The pulse modulation may take the form of pulse amplitude modulation (PAM), pulse duration modulation (PDM), pulse position modulation (PPM), or pulse code modulation (PCM). The resulting train or sequence of modulated pulses is then usually supplied to a carrier frequency transmitter where it modulates the carrier signal. This carrier signal is then transmitted over the transmission link to the receiving equipment. At the receiving end, the pulse train is recovered from the modulated carrier signal by appropriate demodulator apparatus. The recovered pulse train is then supplied to a decoder system which operates to separate the pulses belonging to the different information channels and to apply the separated pulses to different output circuits or devices. The resulting signal appearing across any given output circuit is then used to provide an indication of the information or data value in the corresponding information channel.

In order to obtain the proper separation of pulses belonging to the different information channels, it is necessary to synchronize the separating or decommutating operation in the receiver decoder with the sampling or commutating operation in the transmitter encoder. This synchronization is obtained by inserting distinguishable synchronizing pulses or pulse patterns into the transmitter pulse train at periodic intervals which are related to the timing of the transmitter sampling operation. The receiver decoder system includes circuits which utilize these synchronizing pulses to control or regulate the timing of the decommutating operation.

Under fairly good signal transmission conditions, presently known types of telemetering decoder systems provide generally satisfactory operation. When the received signal contains a substantial amount of electrical noise or is subject to signal fading or other undesired forms of signal impairment, then the performance of known decoder systems leaves much to be desired. In particular, the synchronization of the receiver tends to deteriorate and become unreliable. Also, when the received signal is subject to momentary fade-outs, not only is synchronization lost when the signal disappears, but, in addition, when the signal reappears objectionable lengths of time are required to regain synchronization.

Another problem encountered in time multiplexed telemetering systems is that of handling a wide variety of signal types. Different types of pulse modulation may be utilized. Different numbers of information channels are required to be sampled in different situations. Different sampling rates and, hence, different pulse rates are frequently encountered. It would be desirable, therefore, to have a decoder system which is capable of handling a wide variety of signal types.

It would also be desirable to have a decoder system which is capable of driving a variety of different types of output circuits and devices. In addition to driving different types of analog recording and display devices, it would be desirable to provide a digital form of output capable of driving various types of digital computers and digital data processing machines. It is also desirable to have a decoder system which is capable of providing output signals which are in a siutable form for recording on manetic tape.

It is an object of the invention, therefore, to provide a new and improved telemetering decoder system for decoding a time-multiplexed pulse train.

It is another object of the invention to provide a new and improved telemetering decoder system which is readily capable of decoding different types of pulse modulation.

It is a further object of the invention to provide a new and improved decoder system which is readily capable of handling a variety of different pulse rates, duty cycles and numbers of information channels.

It is an additional object of the invention to provide a new and improved signal decoder system having greater flexibility in the selection of channels to be decoded and which is more readily capable of handling changes in channel programming.

It is a further object of the invention to provide a new and improved decoder system capable of driving a variety of output devices of either the analog or digital type.

It is yet another object of the invention to provide a new and improved decoder system for more rapidly and consistently decoding multiplexed pulse signals which are partially impaired by electrical noise.

It is an additional object of the invention to provide a new and improved decoder system which provides improved compensation for variations in the zero and full scale signal values.

It is yet another object of the invention to provide a multi-channel pulse signal decoder system having new and improved synchronizing circuits for synchronizing the decoding operations with the various elements of the signal to be decoded.

It is a still further object of the invention to provide new and improved synchronizing systems for establishing and maintaining synchronization with noisy input signals.

In accordance with the invention, a telemetering decoder system for decoding time-multiplexed pulse signals includes input circuits having a very high degree of noise rejection caapbility. These input circuits distinguish relatively weak signals in the presence of substantial amounts of electrical noise and provide well-defined output signals which are relatively free of such noise. The input circuits also include a converter system for converting one type of pulse modulation to another type to provide a uniform type of pulse modulation to the remainder of the decoder system. The decoder system also includes timing circuits for generating local timing signals bearing known relationships with respect to the various elements of the input signal. These timing circuits include various logical circuits for recognizing momentary interruptions and impairments in the input signal and for preventing such impairments and interruptions from disturbing the synchronization of the local timing signals. The decoder system further includes circuits for coverting the analog form of pulse modulation supplied by the input circuits to a digital form to provide digital or binary representations of the incoming signal values. The decoder system also includes suitable display circuits for providing both digital and analog types of signal displays. The decoder system additionally includes a plugboard type of programming system for the output display circuits so that a wide degree of flexibility is provided in the number and manner of connection of the output circuits and devices.

For a better understanding of the present invention, together with other and further objects thereof, reference is had to the following description taken in connection with the accompanying drawings, the scope of the invention being pointed out in the appended claims.

Referring to the drawings:

FIG. 1 is a general block diagram of a representative embodiment of a telemetering decoder system constructed in accordance with the present invention;

FIGS. 2, 3 and 4 are waveforms used in explaining the operation of the FIG. 1 decoder system;

FIGS. 5 and 6 show block diagrams of slicer circuits used in the input portion of the FIG. 1 decoder system;

FIG. 7 shows the details of a PAM-to-PDM converter system used in the input portion of the FIG. 1 decoder system;

FIG. 8 shows waveforms used to explain the operation of the FIG. 7 converter system;

FIG. 9 is a general block diagram of the timing circuit portion of the decoder system of FIG. 1;

FIG. 10 shows in greater detail the frequency synchronizer portion of the timing circuits of FIG. 9;

FIG. 11 shows waveforms used in explaining the operation of the FIG. 10 freqeuncy synchronizer;

FIG. 22 is a general block diagram for one of the sets of output display channels of the FIG. 1 decoder system; and FIG. 23 illustrates in a simplified manner the plugboard portion of the FIG. 1 decoder system.

DECODER SYSTEM—GENERAL

Figure 12:
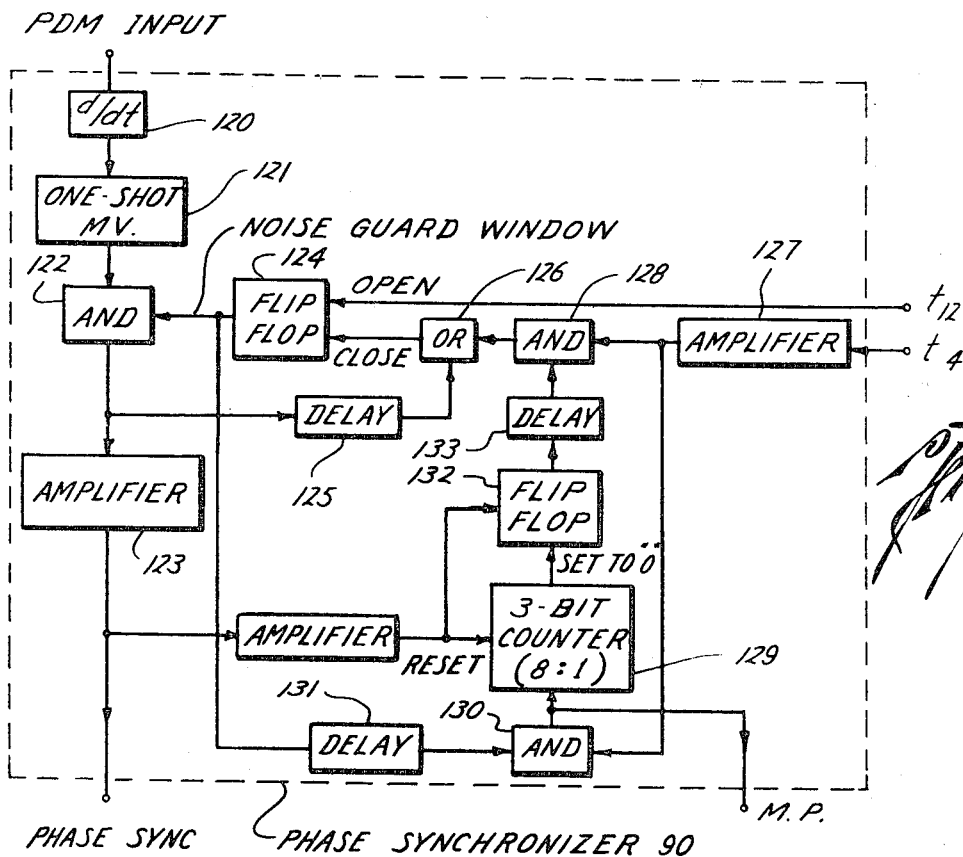
FIG. 12 shows in greater detail the phase synchronizer portion of the FIG. 9 timing circuits.

Referring to FIG. 1 of the drawings, there is shown a representative embodiment of a decoder system constructed in accordance with the present invention for decoding a continuous train of time-multiplexed pulse signals. The incoming pulse signals which are supplied to the input of the decoder system may either be signals which are, at that moment, being received from a distant transmitter station or they may be signals which are being obtained from the playback of a signal previously recorded on magnetic tape or some other form of recording medium. The pulse train supplied to the decoder system is a so-called "video" signal. Any carrier or subcarrier components used in transmitting the signal to the receiving station have been removed by suitable demodulator apparatus at an earlier stage in the receiving equipment.

FIG. 2 shows different types of pulse trains which the present embodiment is capable of handling. The PAM-2 pulse train is a pulse amplitude modulated train having a frame synchronization pattern which occupies two signal channels of each frame or complete cycle of operation. The PAM-3 train uses three channels per frame for synchronizing. In both PAM cases, the frame sync consists of the presence of a full scale signal value for the appropriate number of channels. The PDM train, on the other hand, is a train of pulses wherein the width of duration of the pulses is modulated in accordance with the signal values. In the PDM case, frame sync is provided by the transmission of a zero signal value for two channels per frame. In all three cases, one channel per frame is used to transmit a signal representative of the system zero value, while a second channel is used to provide a signal representative of the system full-scale value.

The present embodiment is constructed to handle anywhere from 10 to 128 channels per frame. For any given number of channels per frame, the present embodiment can handle pulse rates or channel rates of anywhere from 10 to 4600 channels per second. For the PAM case, the channel duty cycle may be set at anywhere between 40% to 90%.

For various timing purposes in the decoder system, each channel portion of the pulse train is subdivided into 16 sub-intervals. These sub-intervals are indicated in FIG. 3. The fixed and regularly-recurring leading edges of the PDM pulses define the initial $t_0$ reference points of the sub-channel intervals. As will be seen, this applies even where the input signal to the system is of the PAM type.

FIG. 4 shows various signal waveforms developed at different points in the FIG. 1 decoder system. These waveforms will be referred to from time to time in the ensuing description.

INPUT CIRCUITS

It will initially be assumed that a PDM type of pulse train is being applied to the input of the FIG. 1 decoder system. This input PDM signal is supplied by way of a variable attenuator 30 to an input amplifier 31. The output signal from amplifier 31 is, among other things, applied to a signal level detector 32. This is a peak detector type of circuit which provides an indication of the peak value of the incoming pulse train. By means of this level detector 32, together with high and low indicator lamps associated therewith, the attenuator 30 is adjusted to provide a predetermined peak signal amplitude at the output of amplifier 31. A typical value for this maximum signal amplitude is 5 volts. A simple voltage or current meter may be used in place of the high and low indicator lamps if desired.

For the case of a PDM signal, the pulse train at the output of amplifier 31 is then supplied by way of a switch 33 to a 50% slicer 34.

FIG. 5 shows the details of the 50% slicer 34. This slicer includes three identical slicer stages 35, 36 and 37 connected in cascade. The PDM input signal is supplied to an input amplifier 38 of the first slicer stage 35. Amplifier 38 is preferably of the unity-gain type. The output of amplifier 38 is supplied to a pair of D.C. restorer circuits 39 and 40. One of these circuits clamps the peak amplitude level of the pulse train waveform to a zero voltage level, while the other restorer clamps the base amplitude level of the waveform to this same zero voltage level. The two clamped waveforms are then combined by adding resistors 41 and 42 to produce a resultant double amplitude waveform. This double amplitude waveform is then sliced about the zero voltage level by a pair of oppositely poled diodes 43 and 44. The small threshold voltage required across these diodes for conduction therein results in a narrow slice of the waveform at the 50% or zero voltage level being supplied to an output amplifier 45 for the first stage. The use of the D.C. restorers and adding resistors serves to improve or sharpen (i.e., decrease) the rise and fall times of the individual pulses. The clipping or slicing diodes 43 and 44 provide a high degree of noise rejection. The waveform or pulse train appearing at the output of amplifier 45 and subsequently at the output of the third stage is identical to the initial input waveform except that noise components have been eliminated and the pulse shape has been improved.

PAM-TO-PDM CONVERSION

Returning to FIG. 1, the input portion of the decoder system includes circuits which are used when the incoming pulse train is of the PAM type for converting this PAM train to a corresponding PDM pulse train. To this end, the pulse train appearing at the output of amplifier 31 is also supplied to a PAM-to-PDM converter 46 and a 10% slicer 47. A sample timer 48, which is driven by the 10% slicer 47, serves to control a sampling operation in the converter 46. The outputs of the converter 46 and slicer 47 are utilized by the remainder of the decoder system only when the input pulse train is of the PAM type. Otherwise, they are disconnected from the remainder of the system.

Assuming for the moment that the incoming pulse train is of the PAM type, then this pulse train is supplied by the input amplifier 31 to the 10% slicer 47. FIG. 6 shows the details of the 10% slicer 47. The purpose of this slicer 47 is to produce an output pulse of full scale amplitude whenever the input pulse amplitude exceeds 10% of the full scale value and to an output level of zero volts whenever the input pulse amplitude is less than 10% of the full scale value. To this end, the PAM train is supplied to a positive peak detector 50 and a negative peak detector 51. The positive detector 50 detects the positive-going peak amplitude level of the pulse train, while the negative detector 51 detects the negative-going peak amplitude level, the latter corresponding to the base line level of the pulse train. The two outputs from detectors 50 and 51 are applied to opposite ends of a potentiometer 52. Consequently, the net voltage across potentiometer 52 is equal to the peak-to-peak full scale value of the incoming pulse train. The sliding contact of potentiometer 52 is set to pick off a voltage level which is equal to 10% of the full scale range. This 10% voltage is supplied to one input terminal of a difference amplifier 53. The unmodified PAM pulse train is, at the same time, suppiled to a second input terminal of the difference amplifier 53. The resulting output signal from difference amplifier 53 corresponds to the original input signal minus the portion thereof lying below the 10% level. This modified signal is then supplied to an amplifier-limiter 54 to produce a sliced PAM signal wherein all pulses which get through the difference amplifier are of equal amplitude.

The sliced PAM signal from slicer 47 is supplied to the sample timer 48 for controlling a sampling operation therein. The details of sample timer 48 are shown in FIG. 7. A train of locally-generated timing pulses, denoted as $f_{64}$, are supplied to a second input of the sample timer 48. These $f_{64}$ timing pulses are occurring at 64 times the channel rate (i.e., 64 per channel). They are supplied by way of an amplifier 55 to AND circuit 56. The sliced PAM pulses are supplied by way of a second amplifier 57 to a second input terminal of the AND circuit 56. The slied PAM pulses serve to activate the AND circuit 56 so that it may supply the $f_{64}$ pulses to a 6-bit counter 58. Counter 58 includes six binary flip-flop stages coupled in cascade in the usual counting manner. Both sides of the four most significant bit stages of counter 58 are coupled to a matrix 59. The various output taps of the matrix 59 are thus energized one after another in succession with the stepping action shifting from one tap to the next each time four of the $f_{64}$ pulses are counted. Since the counting action begins to the leading edge of the PAM channel and since 64 of these pulses are counted during each channel, matrix 59 provides output pulses for various intermediate points in each channel. The leading edges of these pulses are spaced along the channel interval from the 19% to the 75% point at about 6% increments. These leading edges, that is, a selected one of them, is used to initiate a sampling operation in the PAM-to-PDM converter 46. This selection is done by connecting an amplifier 60 to the desired one of the matrix 59 output taps. The occurrence of these periodic sampling intervals is indicated by the pulses of waveform 4b of FIG. 4. The time period $T_s$ between the leading edge of each PAM pulse (waveform 4a) and the beginning of each sampling interval is the thing that is adjusted by adjusting the matrix tap to which the amplifier 60 is connected. In this manner, the channel sampling interval may be set at a desired location within the boundaries of the PAM pulse.

The 6-bit counter 58 is reset to zero by the trailing edge of each of the sliced PAM pulses. This action is obtained by coupling the output of amplifier 57 to the reset terminal of counter 58 by way of an inverter circuit 61 and a differentiating circuit 62. The differentiating circuit 62 preferably includes an amplifier stage having a differentiating circuit in its input and suitable bias voltages for enabling the passage of only one polarity of the differentiated pulses. These considerations also apply to similarly-labeled differentiating circuits used throughout the remainder of the decoder system.

FIG. 7 also shows the details of the PAM-to-PDM converter 46. The unmodified PAM signal appearing at the output of input amplifier 31 is applied to the input of an amplifier 63. The output of amplifier 63 is connected to one corner of a bridge-type diode switch 64. Connected to the opposite corner of the switch 64 is a sampling condenser 65. The switch 64 serves to connect the amplifier 63 to the condenser 65 once each channel at a time determined by the timing pulse $t_s$ supplied by the sample timer 48. This sampling action will be explained with the aid of the waveforms of FIG. 8. Waveform 8a shows the $t_s$ pulses generated by the sample timer 48. The leading edges of these pulses are differentiated by differentiating circuit 66 to produce the narrow pulses of waveform 8b. These narrowed pulses trigger a 25 microsecond one-shot multivibrator 67. The output of multivibrator 67, denoted as $t_s'$, is indicated by waveform 8c. These 25 microsecond pulses define the sampling intervals. These are the pulses shown in waveform 4b of FIG. 4. These so-called sampling pulses are supplied to inverter circuits 68 and 69 in succession to produce the proper polarity pulses for activating or closing the switch 64. The output of inverter 68 is a negative-going pulse which turns off a diode 70, while the output of inverter 69 is a positive going pulses which turns off a second diode 71. With these diodes 70 and 71 non-conductive, the switch 64 is closed and the amplifier 63 is connected to the sampling condenser 65. Amplifier 63 is of the low output impedance type, preferably having a gain of unity.

Consequently, as indicated by waveform 8d, the timing condenser 65 rapidly charges to the value of the PAM signal during the sampling interval.

The positive-going trailing edge of the sampling pulse appearing at the output of inverter 68 is also supplied to a differentiating circuit 72 to produce the differentiated pulse indicated by waveform 8e. This differentiated pulse is applied to a flip-flop circuit 73 to set it to a "1" state and thus start the generation of a PDM signal as indicated by waveform 8f. At this same moment that the flip-flop 73 is turned on, the switch 64 is opened and the amplifier 63 is disconnected from the sampling condenser 65. Consequently, the sampling condenser 65 begins, at this same instant, to discharge at a constant rate through a constant current regulator 74 and an appropriate resistor 75 selected by a switch 76. Switch 76 selects the most appropriate value of resistor for the particular channel rate or pulse rate being received. This linear discharge of the condenser 65 is shown by waveform 8d. During this linear discharge, the voltage across the condenser 65 is monitored by a pick-off diode 77 which serves to compare the condenser voltage with the voltage appearing at the output of a negative peak detector 78. The negative peak detector 78 is connected to the PAM input terminal and serves to detect the voltage level of the pulse train base line relative to a true ground level of zero. This detected voltage thus represents the direct-current offset of the pulse train base line. It is supplied to the other side of the pick-off diode 77 and enables this diode to determine when the voltage across condenser 65 reaches a value corresponding to the pulse train base line. When this voltage equality is reached, the momentary transient provided when the diode 77 begins conduction provides a pick-off pulse as indicated of amplifier 79 and OR circuit 80 to the flip-flop circuit by waveform 8g. This pick-off pulse is supplied by way of amplifier 79 and OR circuit 80 to the flip-flop circuit 73 to set this circuit to the "0" state and, hence, stop the generation of the PDM waveform indicated by waveform 8f.

The output of the differentiating circuit 66 is also coupled by way of the OR circuit 80 to the flip-flop circuit 73 so as to terminate the PDM waveform in case, for some reason, a pick-off pulse is not supplied by amplifier 79. This pulse from differentiating circuit 66 sets the flip-flop 73 back to a zero state at the beginning of the next sampling interval.

The PDM signal produced by the flip-flop 73 appears at the output of an amplifier 81 which, as shown in FIG. 1, is connected by way of a swtch 33 to the 50% slicer 34 whenever the incoming pulse train is of the PAM type. Thus, the remainder of the decoder system, with the exception of some of the timing circuits, always receives a PDM type of signal regardless of the nature of the signal supplied to the decoder system. This PDM waveform is indicated by waveform 4c of FIG. 4, which shows its relationship relative to an incoming PAM signal. Where the incoming signal is, instead, of the PDM type, waveform 4c represents, in fact, the incoming signal itself.

TIMING CIRCUITS—GENERAL

The output of the 50% slicer 34 of FIG. 1, together with the output of the 10% slicer in the case of PAM input signals, is supplied to timing circuits 85. A switch 82 serves to choose between the PDM and sliced PAM signals for the second of the inputs to the timing circuits 85.

FIG. 9 shows the general nature of the timing circuits 85. These timing circuits include a clock pulse generator 86 which produces narrow clock pulses at a frequency which is equal to 64 times the channel rate of the incoming pulse train. This clock pulse generator 86 is of the variable frequency type and can be set to any one of nine operating ranges. These operating ranges extend in overlapping bands from about 0.5 kc. to 350 kc. The range selector switch is set so that 64 times the incoming channel rate falls within the selected frequency band. The clock pulse generator is continuously maintained at exactly 64 times the channel frequency by means of a frequency synchronizer 87. This frequency synchronizer 87 compares the PDM pulse train or the sliced PAM pulse train, as the case may be, with the output of the clock pulse generator 86, designated as $f_{64}$, to develop an error signal representative of any departure of the clock frequency from a value of 64 times the channel rate. This error signal adjusts the frequency of the clock pulse generator 86 so as to minimize the error.

The clock pulses from generator 86 are supplied to the counting input of a 6-bit sub-channel counter 88. This counter 88, together with a matrix circuit 89, serves to develop various timing pulses $t_0$, $t_2$, $t_4$, etc., corresponding to selected sub-intervals of each channel. To this end, both sides of the three most significant bit stages of the counter 88 are connected to the matrix 89. The timing pulses from the matrix 89 have a duraton of ⅛ of a channel interval. The $t_0$ pulse occurs during the $t_0$–$t_2$ sub-interval of each channel, the $t_2$ pulse occurs during the $t_2$–$t_4$ sub-interval, etc. These pulses are labeled in accordance with their leading edges because these are the edges which are generally utilized. Outputs from both sides of the third stage of the 6-bit counter 88, designated as $f_8$ and $\bar{f}_8$, are also utilized where a continuous train of pulses at 8 times the channel rate are required. The 6-bit counter 88 is controlled by a phase synchronizer 90 so that the counter 88 is reset to zero at the moment of occurrence of the leading edge of each PDM pulse. This establishes the desired relationship between the channel sub-intervals and the leading edges of the PDM pulses. The leading edge of the $t_0$ timing pulse thus coincides with the leading edge of the PDM pulse.

In order to recognize which signal channel is being received at any given instant, the $t_4$ timing pulse from the matrix 89 is supplied by way of a differentiating circuit 91 to the counting input of a 7-bit channel counter 92. Synchronization of the counting action in the 7-bit counter 92 with the incoming pulse train is established by means of a frame synchronizer 93. This frame synchronizer 93 recognizes the frame sync patterns in the incoming pulse train and generates an output pulse which resets the 7-bit counter to zero at the appropriate moment so that the count in the counter 92 will be in step with the channel numbers of the received signal channels. This frame sync pulse is supplied to the 7-bit counter 92 by way of OR cricuit 94 and one-shot multivibrator 95, the latter serving to produce a regenerated version of the pulse supplied to its input. Both sides of all seven stages of the counter 92 are connected to a matrix 96. Matrix 96 has 128 output lines which are energized one after the other in succession as the 7-bit counter 92 counts from zero through 127. The signals appearing on typical ones of these lines are indicated by waveforms 4e through 4k of FIG. 4. The leading edges of these channel gates are offset from the leading edges of the PDM pulses because it is the $t_4$ pulses (waveform 4d) and not the $t_0$ pulses which are supplied to the counting input of the 7-bit counter 92. These output lines are permanently wired to 128 different sockets on a plugboard 97 which is shown in FIG. 1 (and FIG. 23).

In order to provide for resetting of the 7-bit counter 92 whenever the frame synchronizer 93 fails to provide the neecssary reset pulse, the timing circuits also include recycle circuits 98. Since the number of channels per frame may be set at anywhere from 10 to 128, it is necessary for the recycle circuits 98 to be able to recognize when the end of a frame has been reached. To this end, a recycle initiating pulse is obtained from the plugboard 97. This recycle line is plugged into the channel gate socket for the fourth from the last channel gate, the last channel gate being determined by the number of channels per frame.

The timing circuits of FIG. 9 also include a TR-3 pulse generator 99 for generating certain transfer command pulses, designated TR-3 and TR-3X, used in other parts of the system.

TIMING CIRCUITS—FREQUENCY SYNCHRONINIZER

The details of the frequency synchronizer 87 are shown in FIG. 10. The purpose of the frequency synchronizer is to synchronize the clock pulse generator 86 so that it runs at a frequency which is 64 times the channel pulse rate. To this end, the PDM (or sliced PAM) pulse train is supplied to a differentiating circuit 100 to develop a train of differentiated pulses represented by waveform 11a of FIG. 11 and corresponding to the leading edges of the PDM (or sliced PAM) pulses. These differentiated channel edge pulses are supplied to a 2-bit or 2-stage binary counter 101. The counter 101 is connected so that it is reset to the "1–0" condition instead of the more usual "0–0" condition. Consequently, the first differentiated pulse supplied to the 2-bit counter 101 serves to set this counter to a "0–1" state, i. e., sets the second or output stage to a "1" state. This "1" condition of the second stage prevails until the third differentiated channel edge pulse is supplied to the counter 101, at which time the second stage returns to the "0" state. The output signal developed by the second stage of counter 101 is indicated by waveform 11b. This output signal is supplied by way of an inverter circuit 102 to a one-shot multivibrator 103. The positive-going trailing edge of the inverted counter waveform serves to trigger the multivibrator 103 so that this multivibrator produces a 50 microsecond output pulse. This 50 microsecond pulse is indicated by waveform 11c. The trailing edge of this pulse is used to trigger a second one-shot multivibrator 104 which, in turn, produces a 25 microsecond output pulse. This 25 microsecond pulse is indicated by waveform 11d.

This 25 microsecond pulse is supplied by way of an inverted circuit 105 to a pulse generator 106. The trailing edge of this 25 microsecond pulse serves to trigger the pulse generator 106 so as to enable it to produce a relatively narrow output pulse as indicated by waveform 11e. This narrow pulse is used as a counter reset pulse and, to this end, is supplied to the reset terminal of the 2-bit counter 101 as well as to the reset terminal of an 8-bit counter 107. In this manner, the frame synchronizer 87 is always reset to its initial conditions at a fixed period of 75 microseconds after the third channel edge pulse is counted by the 2-bit counter 101. In other words, the 2-bit counter 101 will count three differentiated channel edge pulses and then be reset so that it may count the next three differentiated channel edge pulses.

The 25 microsecond pulse appearing at the output of the multivibrator 104 is also used as an error pulse for altering the count in a bi-direction counter 108 whenever the $f_{64}$ clock pulses are not occurring at the desired rate. This 25 microsecond error pulse is supplied to the bi-directional counter 108 by way of AND circuit 109. As will be seen, the AND circuit 109 will pass the 25 microsecond error pulse only if the clock pulse frequency is in error.

In order to determine whether the clock pulse frequency is in error, the output signal from the 2-bit counter 101 is also supplied to an AND circuit 110. Clock pulses from the clock pulse generator 86 are supplied to a second input terminal of the AND circuit 110. The gate type waveform from a 2-bit counter 101 serves to enable the AND circuit 110 so that it may pass the clock pulses which occur during the two channel period during which the output stage of counter 101 is in a "1" state. If the clock pulse generator 86 is running at exactly 64 times the channel rate, then, during these two channel periods, 128 clock pulses should be passed by the AND circuit 110. These gated clock pulses are counted by the 8-bit counter 107. This counter starts from an initial condition where all 8 stages thereof are in a "0" state. Coupled to the various stages of the 8-bit counter 107 are a pair of OR circuits 111 and 112. The outputs of these OR circuits 111 and 112 are, in turn, coupled to an AND circuit 113. These OR and AND logic circuits operate to recognize when the desired number of counts, namely, 128 counts have been counted by the 8-bit counter 107. Actually, in order to prevent excessive hunting of the feedback loop about the desired center frequency, these logic circuits will provide an output indication that the clock pulse frequency is of the correct value whenever the 8-bit counter 107 counts anywhere from 124 to 131 clock pulses in the 2-channel interval. This interval from 124 to 131 counts represents a so-called "dead zone" during which it is assumed that the block frequency is correct and during which it is desired to disable the AND circuit 109 so that no error pulses will be supplied to the bi-directional counter 108.

To understand the circuit logic, it is noted that stages 3 through 7 of the 8-bit counter 107 will be all 1's or all 0's and stage 8 will be of the opposite state during this 124 to 131 count interval. This is a unique condition which will only occur during this particular count interval. To recognize this condition, the input terminals of the OR circuit 111 are individually connected to the "0" sides of stages 3 through 7 and the "1" side of stage 8 of counter 107. Consequently, all inputs to the OR circuit 111 will assume a "0" value during the occurrence of counts 124 through 127. Consequently, OR circuit 111 will produce a "0" output value during this interval. For any other count value, at least one of the inputs to the OR circuit 111 will be at a "1" level providing a corresponding "1" value at the OR circuit output. Thus, the unique condition of a "0" value at the output of OR circuit 111 will occur only for counts 124 through 127.

The second OR circuit 112, on the other hand, is connected in a converse manner so that a unique "0" value of output will be produced for counts 128 through 131. In particular, the individual inputs of OR circuit 112 are connected to the "1" side of stages 3 through 7 and the "0" side of stage 8 of counter 107. Consequently, when the condition for counts 128 through 131 occurs, all inputs to the OR circuit 112 will be at a "0" value. For any other count value, at least one of the inputs to OR circuit 112 will be at a "1" value, thus providing a "1" value at the output of such circuit.

AND circuit 113 will be disabled whenever one or the other or both of the inputs thereof is at a "0" value. For a count value of 124 through 127, the AND circuit 113 will be disabled because the OR circuit 111 is supplying a "0" value to one input thereof. Similarly, during count values of 128 through 131, the AND circuit 113 will be disabled because of the "0" value supplied to the other input thereof by the OR circuit 112. For any count values outside of this 124–131 range, both inputs to the AND circuit 113 will be at the "1" level so that such circuit will be in an activated condition. The output signal from AND circuit 113 is supplied to the second input of the error pulse AND circuit 109 for controlling the gating action thereof. More particularly, the error pulse AND circuit 109 will be activated to pass an error pulse at all times except during the occurrence of the "dead zone" which occurs for count values of 124 through 131.

In order to better understand this operation, some typical examples will now be considered. It will first be assumed that the clock pulse frequency is of the correct value. In this case, the AND circuit 110 will pass exactly 128 pulses during the two channel interval that it is activated. These 128 pulses are represented by waveform 11f of FIG. 11. Less than 128 pulses are actually shown but these are intended as representing 128 pulses. The so-called "dead zone" gate signal appearing at the output of AND circuit 113 is indicated by waveform 11g. This gate signal remains at a "1" value until the 124th clock pulse is counted by the counter 107, whereupon it falls to a "0" value. The counter 107 continues to count until the occurrence of the third differentiated channel edge pulse, whereupon further counting ceases due to the termination of the gate signal supplied to AND circuit 110. The counter 107 then holds its count value and the gate signal from AND circuit 113 stays at the corresponding level. In this case, because an acceptable number of pulses have been counted, this gate signal remains at the zero level. Consequently, when the 25 microsecond error pulse is supplied to AND circuit 109 by the one-shot multivibrator 104, this pulse will not be passed by the AND circuit 109. The reset pulse generated by the trailing edge of the 25 microsecond pulse then resets both the 2-bit counter 101 and the 8-bit counter 107 to their initial conditions. The frequency synchronizer is now set to repeat its operating cycle.

Let it now be assumed that the clock pulse frequency is too high. This is the condition represented by waveforms 11h and 11i. Because the clock frequency is too high, more than 131 pulses will be counted before the third differentiated channel edge pulse is received. Consequently, the zero portion of the dead zone gate will have passed and this gate signal will have returned to the "1" level before the counting action ceases in the 8-bit counter 107. Consequently, when the 25 microsecond pulse occurs, this error pulse will be passed by the AND circuit 109 to the bi-directional counter 108. This correction pulse will actuate the bi-directional counter 108 so as to subtract one count from its stored count value.

Whether the error pulse will add or subtract a count to the value stored in the bi-directional counter 108 is determined by a control flip-flop 114. More particularly, the positive-going transition at the output of the 2-bit counter 101 when the first differentiated channel edge pulse is counted is supplied to this control flip-flop 114 to set it to the "add" condition. This serves to activate the "add" intra-stage transfer circuits inside of the bi-directional counter 108. This "add" condition prevails until the occurrence of the negative-going transition in the dead zone gate signal when the 124th clock pulse is counted by counter 107. This negative-going transition is inverted into a positive transition by inverter circuit 115, the latter serving to set the flip-flop 114 to the "subtract" condition.

For the present case where the clock pulse frequency is too high, the 124 count transition in the dead zone gate has already occurred before the 25 microsecond error pulse is produced. Consequently, the bi-directional counter 108 is in a "subtract" condition when this error pulse is received at the counting input thereof.

The case where the clock pulse frequency is too low is illustrated by waveforms 11j and 11k of FIG. 11. In this case, less than 124 pulses are counted in the two channel interval during which AND circuit 110 is activated. Consequently, the dead zone gate signal never has a chance to assume a zero value. This means that the control flip-flop 114 will be in the "add" condition which was established upon the occurrence of the first differentiated channel edge pulse. Also, the error pulse AND circuit 109 will be in an activated condition when the 25 microsecond error pulse is supplied thereto. Consequently, this error pulse is passed to the bi-directional counter 108 and serves to increase the count therein by a value of one count.

It is seen then that the count value in the bidirectional counter 108 varies in an inverse manner with respect to the clock pulse frequency. If the clock frequency is too low, the count value is increased and, conversely, if the clock frequency is too high, the count value is decreased. The count value in the bi-directional counter 108 is converted to an analog signal value by means of a binary-to-analog converter 116. This analog control signal is used to control the frequency of the clock pulse generator 86 so as to maintain the desired 64:1 relationship between the clock frequency and the incoming channel rate.

TIMING CIRCUITS—PHASE SYNCHRONIZER

Figure 13:
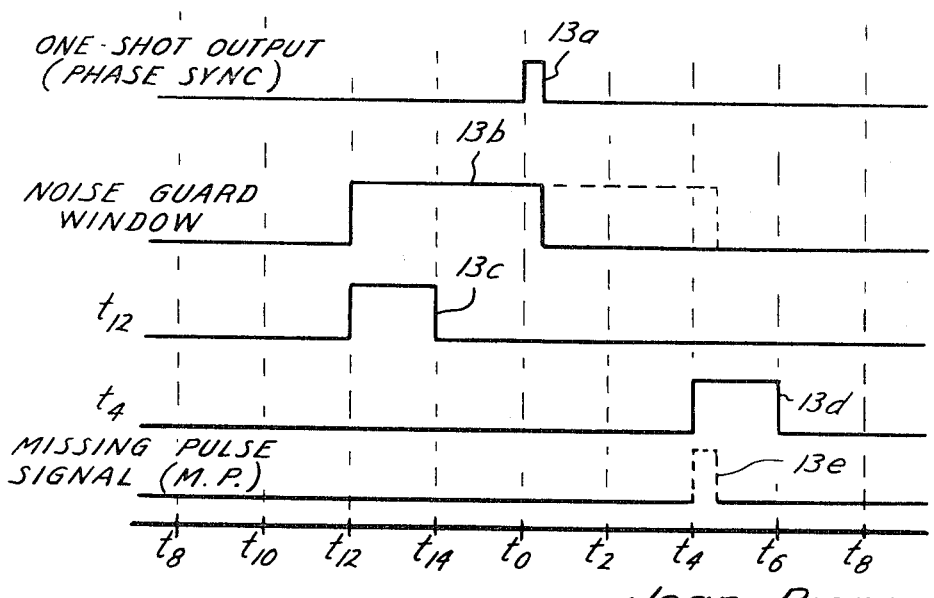
FIG. 13 shows typical waveforms for the FIG. 12 phase synchronizer.

Considering now the phase synchronizer 90 of the FIG. 9 timing circuits, the purpose of this phase synchronizer 90 is to reset the 6-bit sub-channel counter 88 to a zero count condition upon the occurrence of the leading edge of each pulse in the PDM wave train. The details of this phase synchronizer 90 are shown in FIG. 12. As there shown, the PDM pulse train is supplied to a differentiating circuit 120. This circuit produces differentiated output pulses corresponding to the leading edges of the PDM pulses. These differentiated pulses serve to trigger a one-shot multivibrator 121. The output of one-shot multivibrator 121 serves as the phase reset or phase sync pulse for the six-bit sub-channel counter and is supplied thereto by way of an AND circuit 122 and an amplifier 123. This one-shot multivibrator output pulse is indicated by waveform 13a of FIG. 13.

In order to provide improved noise immunity, a noise guard window feature is utilized. This noise guard window (waveform 13b) is generated by a flip-flop circuit 124 and serves to activate the AND circuit 122 only in the vicinity of the expected arrival time of the output pulse from the one-shot multivibrator 121. Consequently, any extraneous noise pulses occurring outside of this window interval will be automatically rejected. This noise guard window is turned on by the leading edge of a $t_{12}$ timing pulse (waveform 13c) obtained from the matrix associated with the sub-channel counter 88. If the phase sync pulse produced by one-shot multivibrator 121 arrives before the $t_4$ sub-channel time,, then this phase sync pulse will be supplied by way of a delay circuit 125 and OR circuit 126 to the "close window" terminal of flip-flop 124. Delay circuit 125 produces a few microseconds of delay to prevent the window from closing until a substantial portion of the phase sync pulse has gotten through AND circuit 122. This pulse at the "close window" terminal shuts off the noise guard window and disables the AND circuit 122.

If the phase sync pulse does not arrive by the $t_4$ time, then the noise guard window is turned off by means of the $t_4$ timing pulse (waveform 13d) which is supplied by way of an amplifier 127, AND circuit 128 and the OR circuit 126 to the "close window" terminal of flip-flop 124. If it is necessary to use the $t_4$ pulse to close the window, then the phase sync pulse is considered as being "missing." This occurrence of a missing phase sync pulse is kept account of by means of a 3-bit counter 129. This is done by supplying the $t_4$ timing pulse by way of an AND circuit 130 to the counting input of the counter 129. AND circuit 130 is gated by the noise guard window by way of a delay circuit 131 so that no further pulses can reach the 3-bit counter 129 until the occurrence of the next noise guard window. Delay circuit 131 provides a few microseconds of time delay so that the AND circuit 130 will stay open long enough to pass a substantial part of the $t_4$ timing pulse. The occurrence of 8 successive missing phase sync pulses enables the 3-bit counter 129 to produce an output pulse which sets a flip-flop circuit 132 to the "0" state. Flip-flop 132 is connected to the AND circuit 128 by way of a delay circuit 133. The normal "1" state of flip-flop 132 serves to keep the AND circuit 128 in an activated condition so that it may pass $t_4$ pulses. When the 3-bit counter 129 sets the flip-flop 132 to the "0" state, then the AND circuit 128 is disabled and, hence, the noise guard window cannot be closed by any further $t_4$ timing pulses. Thus, after eight successive missing phase sync pulses, the noise guard window remains continuously open until a phase sync pulse is again received from the one-shot multivibrator 121. Delay circuit 133 provides a few microseconds of time delay so that AND circuit 128 will not close too rapidly.

A pulse at the output of AND circuit 130 constitutes a so-called "missing pulse" indication and occurs only when a phase sync pulse does not appear at the proper time. These missing pulse (M.P.) signals are used in the TR–3 pulse generator 99 of FIG. 9. A typical missing pulse signal is indicated by waveforms 13e of FIG. 13.

TIMING CIRCUITS—FRAME SYNCHRONIZER

Figure 14:
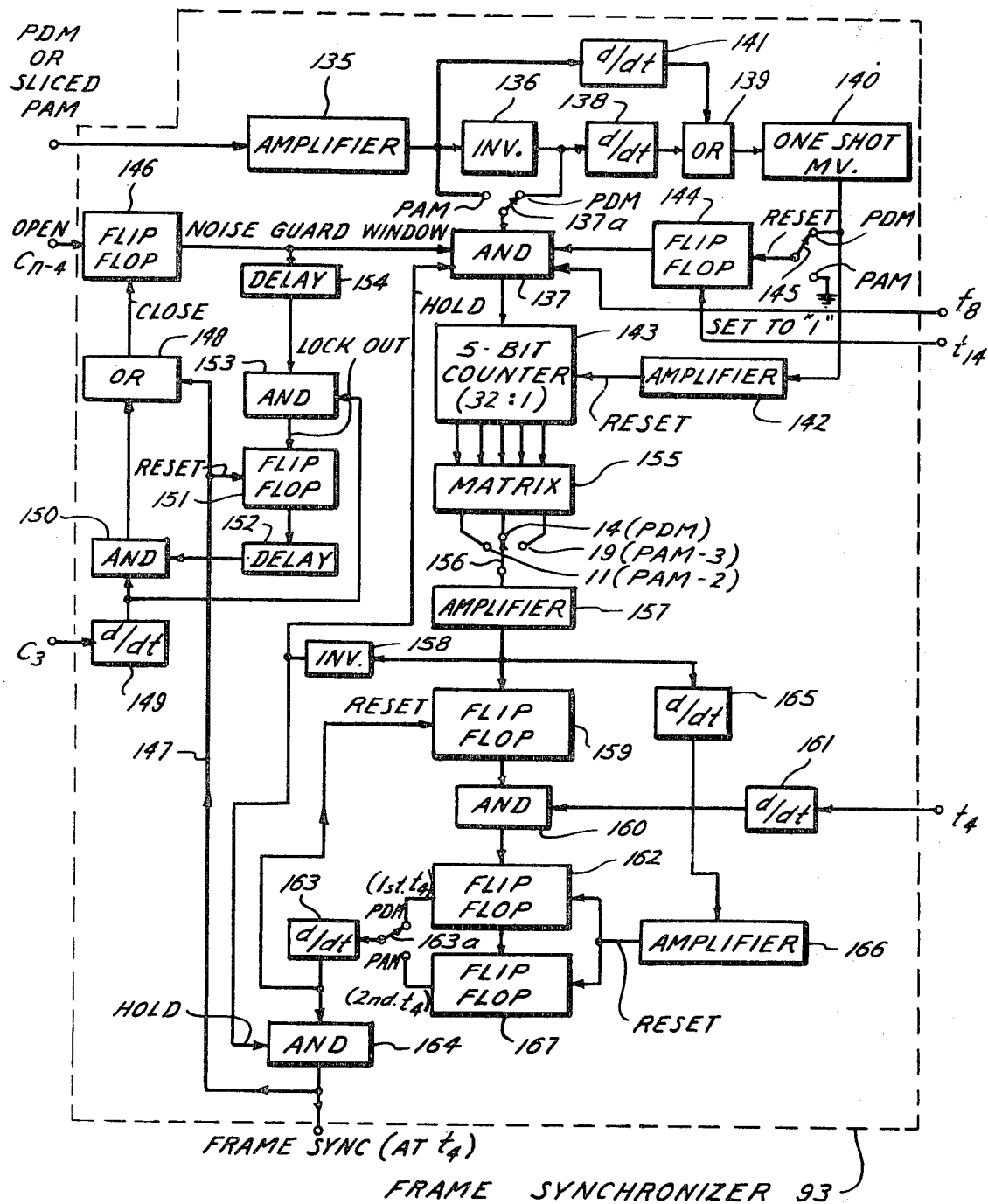
FIG. 14 shows in greater detail the frame synchronizer portion of the FIG. 9 timing circuits.

Considering now the frame synchronizer 93 of the FIG. 9 timing circuits, the purpose of the synchronizer is to keep the count values in the 7-bit channel counter 92 in step with the corresponding channel numbers in the incoming pulse train so that a count of "1" corresponds to signal channel "1," a count of "2" corresponds to signal channel "2," etc. The details of frame synchronizer 93 are shown in FIG. 14. The operation of this frame synchronizer is slightly different depending upon whether the received pulse train is of the PAM–2, PAM–3 or PDM type. It will initially be assumed that the pulse train supplied to the input of the decoder system is of the PDM type. In this case, the incoming PDM signal is supplied to an input amplifier 135 of the frame synchronizer 93. The PDM pulse train at the output of amplifier 135 is shown as waveform 15a of FIG. 15. An inverted replica of this PDM pulse train is supplied by an inverter circuit 136 and a switch 137a to a multiple-input AND circuit 137. AND circuit 137 will produce an output level of "1" only when all input lines thereto are at the "1" level.

The inverted PDM pulse train is also supplied by way of a differentiating circuit 138 and an OR circuit 139 to the trigger input of a one-shot multivibrator 140. The positive-going trailing edges of the inverted PDM pulses serve to trigger the one-shot multivibrator 140. The non-inverted PDM pulse train is also supplied to the one-shot multivibrator 140 by way of a differentiating circuit 141 and the OR circuit 139. In this case, the leading edges of the PDM pulses are of the positive-going type and it is these edges which trigger the one-shot multivibrator 140. Thus, one-shot multivibrator 140 is triggered on both the leading and trailing edges of the incoming PDM pulses. The output of one-shot multivibrator 140 is shown by waveform 15b of FIG. 15. These pulses are supplied by way of an amplifier 142 to a 5-bit counter 143 and serve to reset the counter 143 to a zero count condition. In the PDM case, these pulses from one-shot multivibrator 140 also serve to reset a flip-flop circuit 144 to a zero state by way of a switch 145. This flip-flop circuit 144 is periodically set to the "1" state by the leading edges of the $t_{12}$ timing pulses. The output of flip-flop 144 is a desired counting delay gate and is applied to a second input of the multiple input AND circuit 137. The output gate from flip-flop 144 is indicated by waveform 15c.

A third input to the multiple-input AND circuit 137 consists of a continuous train of timing pulses, designated as $f_8$, occurring at a rate of eight times the channel rate. These pulses are indicated by waveform 15e of FIG. 15. It is these $f_8$ pulses which are counted by the 5-bit counter 143, provided that they are passed by the AND circuit 137.

A further input to the multiple-input AND circuit 137 is a noise guard window (waveform 15d) which is generated by a flip-flop circuit 146. This flip-flop 146 is set to the "one" state and, hence, the window is opened by the leading edge of the $C_{n-4}$ channel gate. This is the channel gate for channel ($n$–4) where $n$ is the total number of channels per frame. The noise guard window may be closed in two different ways. The first is by the frame reset or frame sync pulse which constitutes the final output of the frame synchronizer 93. This frame reset pulse is applied by way of a line 147 and an OR circuit 148 to the "close" terminal of flip-flop 146. The second way and the way which occurs if the frame reset pulse is missing is by way of the leading edge of the $C_3$ channel gate which is supplied to the flip-flop 146 by way of a differentiating circuit 149 and an AND circuit 150. The second input of AND circuit 150 is normally maintained in an activated condition by means of a flip-flop circuit 151 and a short delay circuit 152, the flip-flop 151 normally being in the "one" state. If the $C_3$ channel gate leading edge is used to close the flip-flop 146, then this $C_3$ leading edge is also passed by way of an AND circuit 153 to the flip-flop 151 to set it to a "zero" state. Passage through AND circuit 153 is possible because the noise guard window is still present at the output of a delay circuit 154 at this moment. When the flip-flop 151 is set to the "zero" state then the AND circuit 150 is disabled and will not pass any further $C_3$ leading edges until the frame synchronizer 93 has again generated a desired output frame reset pulse. Such a frame reset pulse serves to reset the flip-flop 151 to the "one" state. In effect then, if the frame synchronizer 93 misses a frame sync pattern in the incoming PDM train and fails to produce an output reset pulse, then the noise guard window feature is disabled and the frame synchronizer is free to provide a continuous examination of the incoming pulse train to locate the next frame sync pattern.

An additional input to the multiple-input AND circuit 137 is a so-called "hold" signal which acts to temporarily disable the AND circuit 137 for a short period following the recognition of a true frame sync pattern. This hold signal is represented by waveform 15g.

Figure 15:
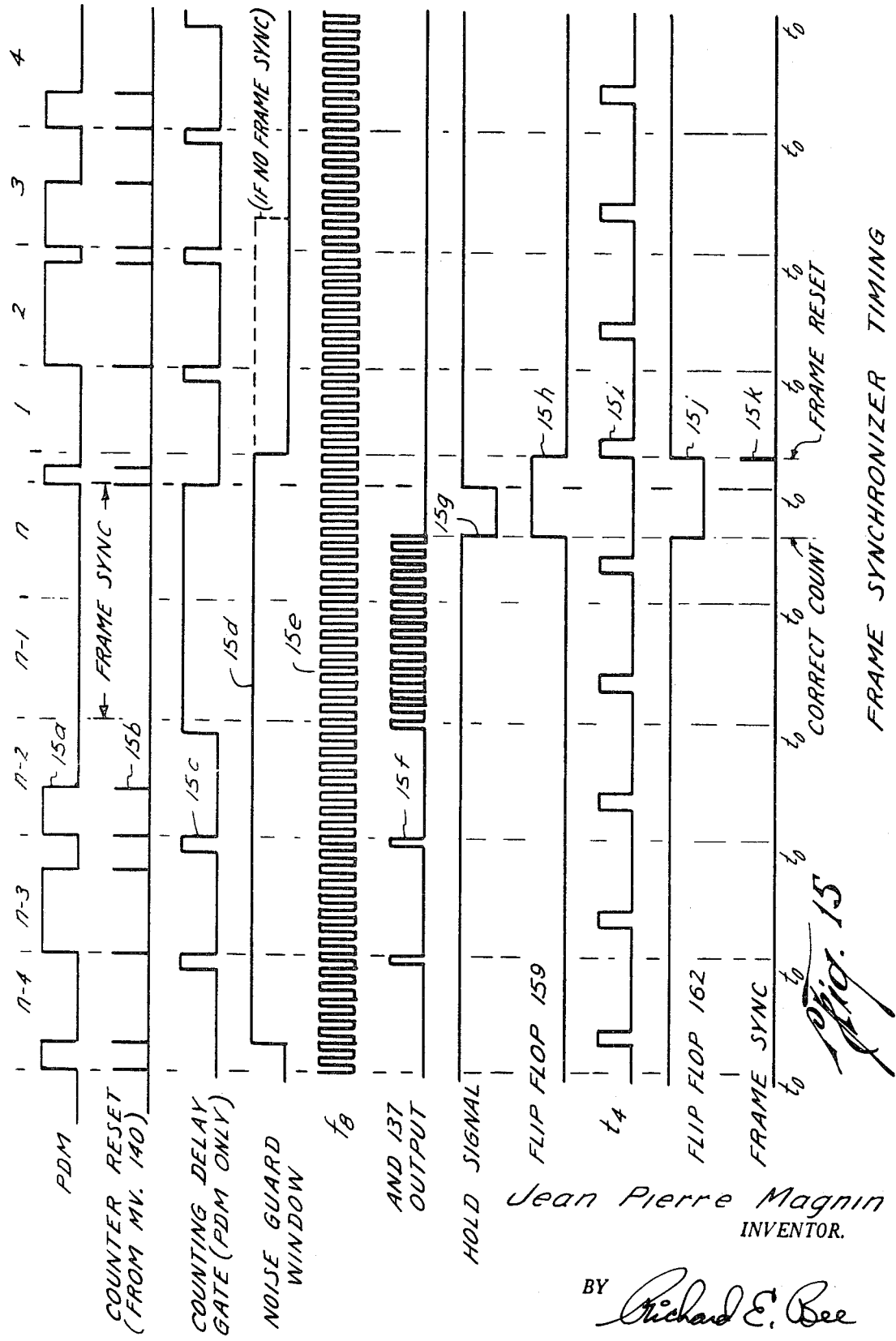
FIG. 15 shows various waveforms for the FIG. 14 frame synchronizer.

From the foregoing, it is seen that the multiple-input AND circuit 137 has five different input signals supplied to the input thereof. These input signals are represented by waveforms 15c, 15d, 15e, 15g and an inverted replica of 15a. AND circuit 137 will produce output signals of a binary "one" value only when all input signals are at the "one" level. The waveform 15f of FIG. 15 shows the output signals obtained from this AND circuit 137. They are in the form of short pulses corresponding to the $f_8$ timing pulses during selected intervals. The only time a significant number of these pulses reaches the output of AND circuit 137 is during the extended period of channels $n$–1 and $n$, which is when the PDM frame sync pattern occurs. This pattern is a two-channel zero value pattern which, for purposes of the AND circuit 137, is converted to a "one" value by the inverter 136.

The pulses from AND circuit 137 are counted by the 5-bit counter 143. A matrix 155 is coupled to the five stages of the 5-bit counter 143 and serves to produce output pulses corresponding to selected count values in the 5-bit counter 143. For the case of a PDM signal, it is sufficient to accept the recognition of 14 of the $f_8$ timing pulses as being a clear indication of the occurrence of the frame sync pattern in the PDM pulse train. Thus for the PDM case, whenever 14 $f_8$ pulses are counted by the 5-bit counter 143, a binary "one" level signal is supplied by the matrix 155 and the switch 156 to an amplifier 157. The signal at the output of amplifier 157 is inverted by inverter 158 to produce the "hold" signal for the AND circuit 137. Thus, the output signal at the output of amplifier 157 is an inverted replica of the "hold" signal indicated by waveform 15g. The zero level of the "hold" signal which appears at the output of the inverter 158 at this time serves to disable the AND circuit 137 and prevent further counting by the counter 143 as soon as the correct number of counts is recognized. This, in turn, holds the output of amplifier 157 at the one level for the time being. This amplifier 157 output level is returnd to a zero value when the 5-bit counter 143 is reset by the one-shot multivibrator 140 (waveform 15b).

The positive-going zero to one transition at the output of amplifier 157 when a correct count is recognized is used to control the remainder of the frame synchronizer circuits. In the first place, this positive-going transition sets a flip-flop 159 to a one state. The output of flip-flop 159 is indicated by waveform 15h. This "one" output enables an AND circuit 160 to gate through the differentiated leading edge of the first $t_4$ timing pulse to occur after the recognition of a correct count. This $t_4$ leading edge is supplied by way of a differentiating circuit 161. The $t_4$ leading edge is used because the 7-bit channel counter 92 which it is desired to reset is also being driven by the $t_4$ timing pulses (see FIG. 9). The $t_4$ leading edge passed by the AND circuit 160 sets a flip-flop circuit 162 to the "one" state (waveform 15j). The resulting transition at the output of flip-flop 162 is differentiated by differentiating circuit 163 to produce a positive-going pulse at the $t_4$ time which constitutes the final frame reset or frame sync pulse for the frame synchronizer. This frame reset pulse is indicated by waveform 15k. It is passed by a switch 163a and an output AND circuit 164 to the 7-bit channel counter reset circuits because, at this time, the "hold" signal applied to the second input of AND circuit 164 is at the one level (see waveform 15g). The frame reset pulse at the output of differentiating circuit 163 is supplied back to the flip-flop 159 to reset it to a zero state (see waveform 15h). As mentioned earlier, this frame reset pulse is also supplied by way of the line 147 to the noise guard window circuits. Flip-flop circuit 162 is reset to the zero state shortly before it is required to recognize the first $t_4$ leading edge. This reset action is obtained by using the output signal transition at the output of amplifier 57 at the moment a correct count is recognized. This signal transition is supplied by way of a differentiating circuit 165 and an amplifier 166 to the reset terminal of the flip-flop 162.

If, instead of PDM, the incoming pulse train is of a PAM type, then the 10% sliced PAM signal is applied to the input amplifier 135 of the frame synchronizer 93. In this case, switch 137a is set to the PAM position so that the full-scale PAM frame sync value provides the proper activation for AND circuit 137. For the case of PAM, switch 145 is set to the ground position so that the flip-flop 144 is effectively removed from the system. The switch 156 at the output of matrix 155 is set to provide an indication of either 11 counts or 19 counts in the 5-bit counter 143, depending on whether the PAM signal has a two-channel sync pattern or a three-channel sync pattern. Switch 163a is set so that the output differentiating circuit 163 receives its signal from a second flip-flop circuit 167 which is driven by the first flip-flop circuit 162. The consequence of using the second flip-flop 167 is that two $t_4$ leading edges must be recognized after the occurrence of a correct count before the necessary signal transition is applied to the output differentiating circuit 163. This results from the different timing requirements in the PAM case.

TIMING CIRCUITS—TR-3 PULSE GENERATOR

Figure 16:
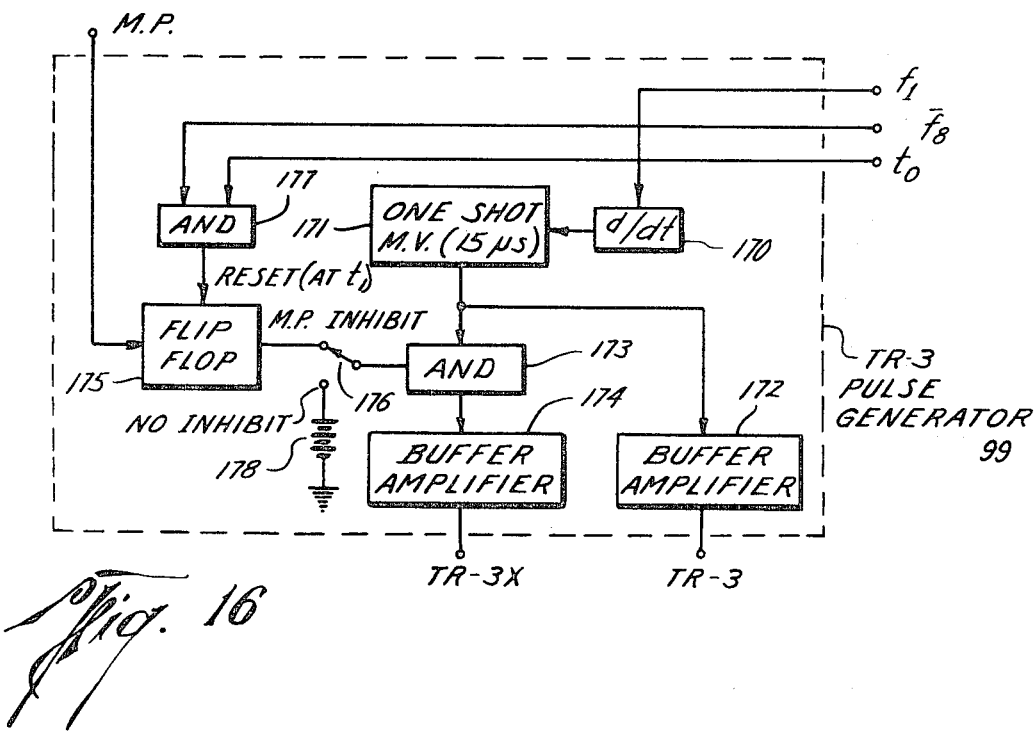
FIG. 16 shows the details of a TR-3 pulse generator potrion of the timing circuits of FIG. 9.

FIG. 16 shows the details of the TR-3 pulse generator portion of the timing circuits of FIG. 9. The basic input to this pulse generator is the $f_1$ waveform from the sixth stage of the 6-bit sub-channel counter 88. This $f_1$ waveform contains a positive-going signal transition occurring at time $t_o$ of each channel. This signal transition is differentiated by a differentiating circuit 170 and supplied to the trigger input of a one-shot multivibrator 171. This multivibrator 171 produces a 15 microsecond output pulse which constitutes the TR-3 transfer command pulse. This pulse is buffered by a buffer amplifier 172. This 15 miscrosecond pulse is also supplied by way of an AND circuit 173 and a second buffer amplifier 174 to produce a second transfer command pulse TR-3X. This second transfer command pulse is, however, subject to being inhibited by signals supplied to the second input of AND circuit 173. Inhibition of the AND circuit 173 is provided by a flip-flop circuit 175 which is coupled thereto by way of a switch 176. The $\bar{f}_8$ and $t_o$ timing signals supplied to a second AND gate 177 produce a reset pulse for resetting the flip-flop 175 to a "one" state at the time $t_1$. In the "one" state, the flip-flop 175 provides a "one" level output which activates AND circuit 173. A second input to the flip-flop 175 is provided by the missing pulse (M.P.) signal developed by the phase synchronizer 90. This missing pulse signal, when it occurs, occurs at time $t_4$ and sets the flip-flop 175 to the zero state. In this state, the AND circuit 173 is disabled or inhibited. This inhibited condition prevails until the next reset at $t_1$. Thus, AND circuit 173, when inhibited, will not pass the 15 microsecond pulse from multivibrator 171 since this pulse occurs at time $t_o$. This inhibiting action means that no TR-3X transfer command will be produced whenever the phase synchronizer 90 recognizes that the incoming pulse train does not contain a pulse for that channel interval. This inhibiting action may be removed if desired by setting the switch 176 to the terminal which is connected to voltage source 178.

TIMING CIRCUITS—RECYCLE CIRCUITS

Figure 17:
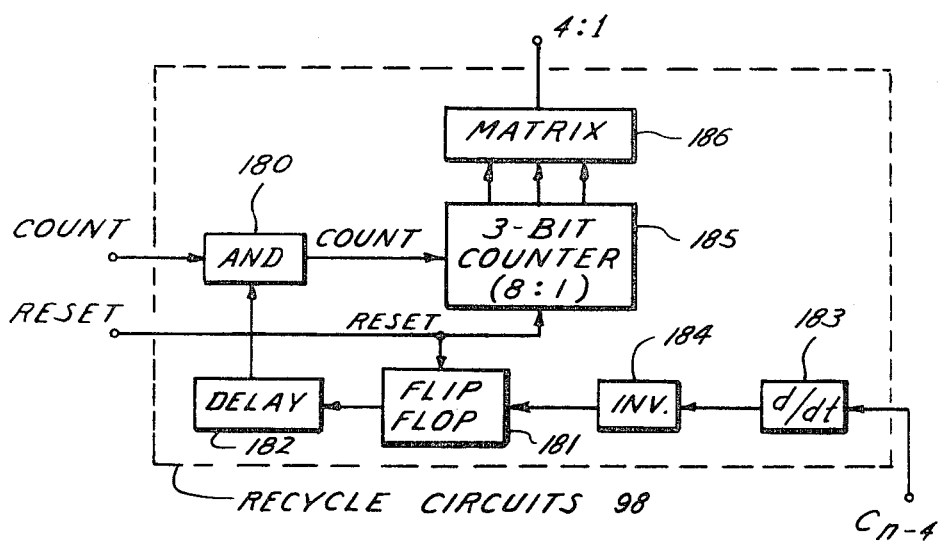
FIG. 17 shows the details of the recycle circuits of the FIG. 9 timing circuits.

FIG. 17 shows the details of the recycle circuits 98 contained in the timing circuits of FIG. 9. The purpose of these recycle circuits 98 is to generate a frame reset pulse for the 7-bit channel counter 92 whenever the frame synchronizer 93 fails to provide a reset pulse. This feature is necessary in order to obtain recycling of the 7-bit counter 92 where the number of channels per frame is less than the maximum capacity (128) of the 7-bit counter. This recycling by recycle circuits 98 in effect makes the counter 92 a counter of readily adjustable capacity. The $t_4$ timing pulses applied to the 7-bit counter 92 are also supplied to a first input terminal of an AND circuit 180 of the recycle circuits 98. The second input for AND circuit 180 is obtained from a flip-flop circuit 181 by way of a short time delay circuit 182. Flip-flop 181 is normally in the zero state so that AND circuit 180 is normally disabled.

Shortly before the time when the frame reset pulse is expected from the frame synchronizer 93, the trailing edge of the $C_{n-4}$ channel gate is effective, by way of differentiating circuit 183 and inverter circuit 184, to set the flip-flop 181 to the "one" state. This activates the AND circuit 180. As a consequence, the 3-bit counter 185 begins counting the $t_4$ timing pulse. When the fourth of these $t_4$ pulses is counted, a matrix 186 coupled to the 3-bit counter 185 produces an output pulse. This pulse occurs at the time that the frame sync pulse should be received from the frame synchronizer 93 if the circuits are correctly synchronized. This pulse or signal transition from the matrix 186 is supplied by way of OR circuit 94 to the one-shot multivibrator 195 (both of FIG. 9) to produce the desired resetting of the 7-bit channel counter 92 in the absence of a frame reset from the frame synchronizer 93. The reset pulse at the output of one-shot multivibrator 95, whether generated by a true frame reset or by the frame reset generated by the recycle circuits, is supplied to the recycle circuits to reset both the flip-flop 181 and the 3-bit counter 185 to the zero state. Subsequent to this, the recycle circuits 98 remain dormant until shortly before the next expected frame reset pulse whereupon they repeat the operating sequence just described.

PDM-TO-PCM CONVERTER—GENERAL

Returning briefly to FIG. 1, the PDM pulse train appearing at the output of the 50% slicer 34 is also applied to the input of a serial PDM to parallel PCM converter 200. In the present embodiment, this converter 200 converts each PDM pulse into a momentary 8-bit PCM code, the individual bits of which appear on corresponding ones of the eight parallel output lines from the converter 200. Various timing signals for controlling the converting action are obtained from both the timing circuits 85 and the plugboard 97, the latter supplying channel gates during the occurrence of the zero and full-scale channels (see waveforms 4*j* and 4*k* of FIG. 4). The TR-3 and $t_8$ timing pulses are also shown in FIG. 4 as waveforms 4*n* and 4*o* respectively.

Figure 18:
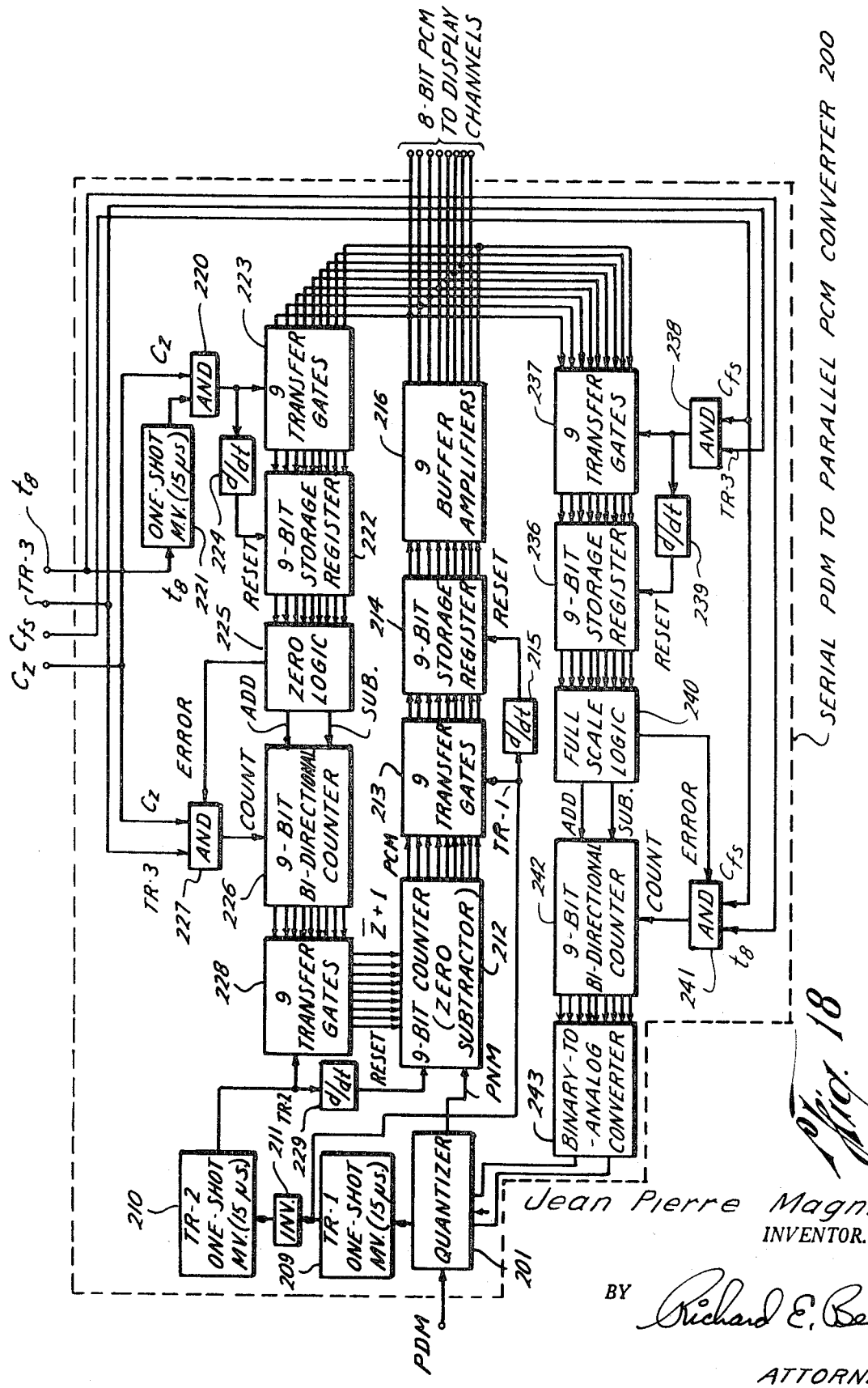
FIG. 18 shows a general block diagram of the serial PDM to parallel PCM converter portion of the FIG. 1 decoder system.
Figure 19:
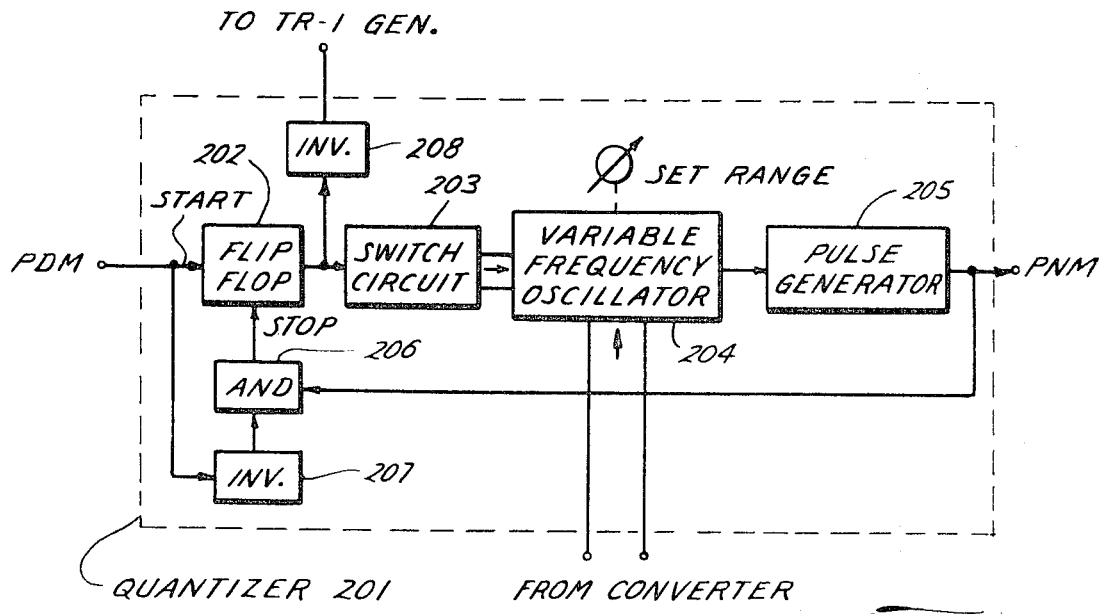
FIG. 19 shows the details of the quantizer portion of the FIG. 18 converter.

FIG. 18 shows the PDM-to-PCM converter 200 in greater detail. As shown in FIG. 18, the PDM pulse train from the 50% slicer 34 is applied to the input of a quantizer 201. The details of quantizer 201 are shown in FIG. 19. Considering FIG. 19, the input PDM pulse train is applied to a flip-flop circuit 202. The leading edge of each PDM pulse serves to set the flip-flop 202 to a "one" condition. As a consequence, flip-flop 202 serves to activate a switch circuit 203 which, in turn, turns on a variable frequency oscillator 204. The basic oscillator range is set in accordance with the pulse rate of the PDM signal being received. The frequency of the oscillator 204 is several hundred times the incoming channel pulse rate. For example, for a channel rate of 600 channels per second, the oscillator 204 will have a frequency of approximately 260 kilocycles. The oscillations of oscillator 204 are supplied to a pulse generator 205 to drive the generator 205 so that this generator produces narrow rectangular output pulses of the same frequency as the oscillator 204. In addition to being applied to the output terminal of the quantizer 201, these narrow pulses are applied to a first input terminal of an AND circuit 206. The PDM input signal is supplied to a second input terminal of AND circuit 206 by way of an inverter cricuit 207. Because of the inverting action, the AND circuit 206 will be activated only when the PDM pulse is not present. Thus, for the duration of the PDM pulse, the leading edge of which started the oscillator 204, the AND circuit 206 is disabled. As soon as the trailing edge of this PDM pulse occurs, AND circuit 206 is again activated. As a consequence, the first narrow pulse from generator 205 to occur after the trailing edge of the PDM pulse serves to set the flip-flop circuit 202 back to the zero state. This disables the switch circuit 203 which, in turn, shuts off the oscillator 204. Consequently, pulse generator 205 ceases producing output pulses. In this manner, the number of output pulses produced at the output of pulse generator 205 is directly proportional to the duration of the PDM pulse. This, in turn, is proportional to the signal value in this pulse channel. There is thus provided at the output of generator 205 a so-called "pulse number modulation" (PNM).

The ouptut waveform from flip-flop 202 is also supplied by way of an inverter circuit 208 to a second output terminal of the quantizer 201. This inverted waveform is used to drive the TR–1 and TR–2 transfer pulse generator. These transfer pulse generators are shown in FIG. 18 as one-shot multivibrators 209 and 210. Each produces a 15 microsecond output pulse. The TR–1 multivibrator 209 is driven by the trailing edge of the output waveform of the flip-flop circuit 202 of the quantizer 201. The TR–2 multivibrator 210 is driven by the trailing edge of the TR–1 output pulse from the multivibrator 209 by way of inverter circuit 211. These TR–1 and TR–2 transfer command pulses are represented by waveform 4-*l* and 4-*m* of FIG. 4.

The pulse number modulation appearing at the output of quantizer 201 is applied to the counting input of a 9-bit counter (zero subtractor) 212. It is noted from waveform 4*c* of FIG. 4 that even when the PDM signal assumes a value of zero (see channel 1), it nevertheless has a finite width. This width can be thought of as a zero offset for the system. As a consequence of this zero offset, the pulse number modulation at the output of quantizer 201, for a given signal channel pulse, has a number of pulses corresponding to:

$$Z+N$$

where Z pulses represent the zero offset and N pulses represent the channel information or data value. The purpose of the zero subtractor counter 212 is to remove the Z pulses corresponding to the zero offset. This is done by adding the "complement plus one" of the zero offset to the total input number to obtain a resultant number from which the zero offset has, in effect, been subtracted. In other words, at the occurrence of the transfer command pulse TR–2, a binary number corresponding to:

$$\bar{Z}+1$$

is inserted into the zero subtractor 212, where $\bar{Z}$ represents the complement of the zero offset Z. During the occurrence of the ensuing PDM pulse, the corresponding pulse number modulation pulses thereof are read into the counter 212 in a serial manner. After all pulses for this channel have been read into the counter 212, the reading of this counter corresponds to:

$$(\bar{Z}+1)+(Z+N)$$

But since $$(\bar{Z}+1+Z)=0$$

the number in the counter 212 is actually the number N corresponding to the data value in the PDM channel.

At the occurrence of the TR–1 transfer command, the contents of counter 212 are transferred in a parallel manner by way of nine separate transfer gates 213 to a 9-bit storage register 214. At the same time, the differentiated leading edge of the TR–1 transfer pulse is supplied by a differentiating circuit 215 to the reset terminals of the nine stages of register 214. As a consequence, any stage which does not receive a "one" signal from the transfer gates 213 is automatically reset to the zero state. Note that the "one" signal coming by way of the transfer gates has a duration corresponding to that of the TR–1 pulse. Consequently, when one of these pulses is applied to the same stage as the differentiated reset pulse, the longer duration TR–1 pulse controls and sets the stage to a "one" state. The output of the 9-bit storage register 214 is continuously available at the eight parallel PCM output terminals of the converter 200 and is applied to such terminals by way of buffer amplifiers 216. The parallel PCM data for any given channel is available at these 8-bit output terminals for a full channel interval whereupon it is replaced by the PCM data value for the succeeding channel interval. Thus, the parallel PCM values for the different signal channels appear at the 8-bit output terminals of converter 200 one after another in succession in the same manner as the signal channels occur in the incoming pulse train.

PDM-TO-PCM CONVERTER—ZERO COMPENSATION

Once each frame, during the occurrence of the "zero" channel, the PDM-to-PCM converter 200 analyzes this system zero value signal and makes any necessary correction to the zero complement number which is set into the zero subtractor counter 212. As a consequence, the converter 200 automatically compensates for any drift or change in the system zero scale value.

Considering this zero compensation in more detail, the $t_8$ timing pulse and the $C_z$ zero channel gate are applied to an AND circuit 220. The $t_8$ timing pulse is not applied directly to the AND circuit 220 but, instead, the leading edge thereof triggers a one-shot multivibrator 221 which, in turn, supplies a 15 microsecond pulse to the AND circuit 220 at the $t_8$ time. The simultaneous occurrence of the modified $t_8$ and the $C_z$ zero channel gate serves to transfer the 8-bit PCM representation of the zero channel, which is now in the storage register 214, to a 9-bit storage register 222 in hte zero compensation channel. This transfer is effected by the nine transfer gates 223 together with the differentiating circuit 224 which resets to zero any storage register stage which does not receive a "one" level input.

The new zero channel zero value in the storage register 222 is examined by zero logic circuit 225 to determine whether any correction is required of a 9-bit bi-directional counter 226. If the new zero value differs from the previous zero value, then the zero logic circuits 225 serve to activate an AND gate 227 so that the TR-3 transfer pulse occurring during the occurrence of the zero channel gate $C_z$ will be applied to the counting input of the bi-directional counter 226. This TR-3 pulse applies a one count correction to the bi-directional counter 226. Whether this count is added or subtracted from the existing count in the counter 226 is determined by the zero logic circuits 225. The binary value in the bi-directional counter 226 is, in this manner, continuously maintained at a value corresponding to the "zero complement plus one" ($\overline{Z}+1$). This "zero complement plus one" number in the counter 226 is set into the 9-bit zero subtractor counter 212 shortly before each PDM pulse is applied to the quantizer 201. This "set in" of the zero complement is effected by the nine transfer gates 228 together with the differentiating circuit 229 upon the occurrence of the TR-2 transfer command.

Figure 20:
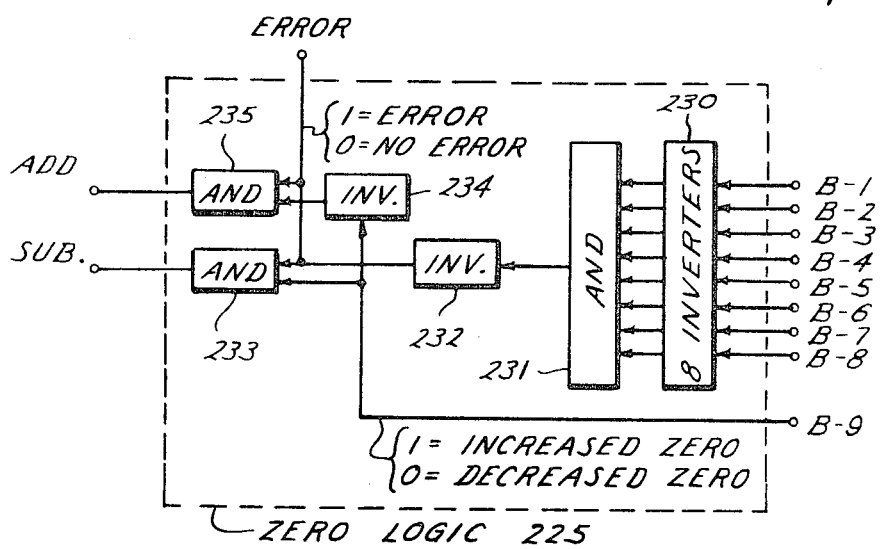
FIG. 20 shows the zero logic portion of the FIG. 18 converter.

The details of the zero logic circuits 225 are shown in FIG. 20 Bits 1 through 8 (B-1 through B-8), the eight least significant bits of the 9-bit binary code, are supplied by way of eight separate inverter circuits 230 to a multiple input AND circuit 231. Because of the inverting action, the AND circuit 231 will produce an output "one" level whenever all eight of the original B-1 through B-8 bit values are "zero." This is the ideal case and occurs when the new zero channel reading is the same as the previous zero channel reading. In other words, shortly before the new zero channel reading was read into the zero subtractor counter 212, this counter was set to the "zero complement plus one" of the previous zero channel value. If the new value being read in is the same as the old value, then the total count in the zero subtractor counter 212 when the read in is completed will be zero, i.e., all nine counter stages will be in a zero state, except for the ninth or overflow stage which will be in a "one" state.

The "no error" indicating "one" level at the output of AND circuit 230 is inverted to a zero level by inverter circuit 232. Thus, at the output of inverter 232, a "zero" level indicates "no error," while a "one" level indicates that there is an error, i.e., that the new zero value differs from the previous zero value. The overflow bit, namely, the B-9 bit, is used to provide an indication of the sense of the error, i.e., whether the new zero is larger or smaller than the previous zero value. If the new zero value is larger then the zero subtractor counter 212 will have counted around past zero and the overflow bit B-9 will be at a "one" level. This one level is used to activate an AND circuit 233 so as to tell the bi-directional counter 226 (FIG. 18) to subtract the TR-3 pulse that the AND circuit 227 passes when there is an error. If, on the other hand, the overflow bit B-9 is of "zero" value, this indicates that the new zero value is less than the previous zero value. This B-9 zero level is inverted by inverter circuit 234 to activate an AND circuit 235. AND circuit 235 tells the bi-directional counter 226 to add the TR-3 pulse passed by AND cricuit 227.

PDM-TO-PCM CONVERTER—FULL-SCALE COMPENSATION

Returning to FIG. 18, the PDM-to-PCM converter 200 is also operative once each frame, during the occurrence of the PDM channel carrying the full-scale value of the system, to, in effect, make any necessary adjustments of the "gain" of the PDM-to-PCM converter so that the full-scale output value of the converter 200 will always be represented by a binary number value of 250. In terms of a 9-bit binary code, the number 250 is "011111010," where the least significant bit is on the right. The ninth bit is used to provide an overflow indication and, in this regard, changes to a value of "one" upon the count of 256.

The full-scale value during the full-scale channel is transferred from the primary 9-bit storage register 214 to a full-scale 9-bit storage register 236 in the full-scale branch by means of 9 separate transfer gates 237. Transfer is obtained at the simultaneous occurrence of the full-scale gate $C_{fs}$ and TR-3 command pulse by way of AND circuit 238 and a differentiating circuit 239. After its transfer to the storage register 236, the binary value of the full-scale number is examined by full-scale logic circuit 240 to determine whether this number is equal to the desired full-scale value of "250." If it is not, then an error command is issued to an AND circuit 241 so that the next $t_8$ timing pulse which coincides with the $C_{fs}$ full-scale gate will be passed to a 9-bit bidirectional counter 242 to provide a one count correction therein. Whether this correction is added or subtracted depends on the "add"-"subtract" commands issued by the full-scale logic circuit 240. Thus, there is maintained in the bidirectional counter 242, a continuous representation of the full-scale channel value. This binary representation is converted to an analog signal by means of a binary-to-analog converter 243. This analog signal is supplied to the quantizer 201 to control the frequency of the variable frequency oscillator contianed therein. This control action is of a degenerative nature so that the complete feedback loop operates to regulate the frequency of the quantizer oscillator so that the number of pulses counted during the occurrence of the full-scale channel pulse will always be equal to the desired value of "250."

Figure 21:
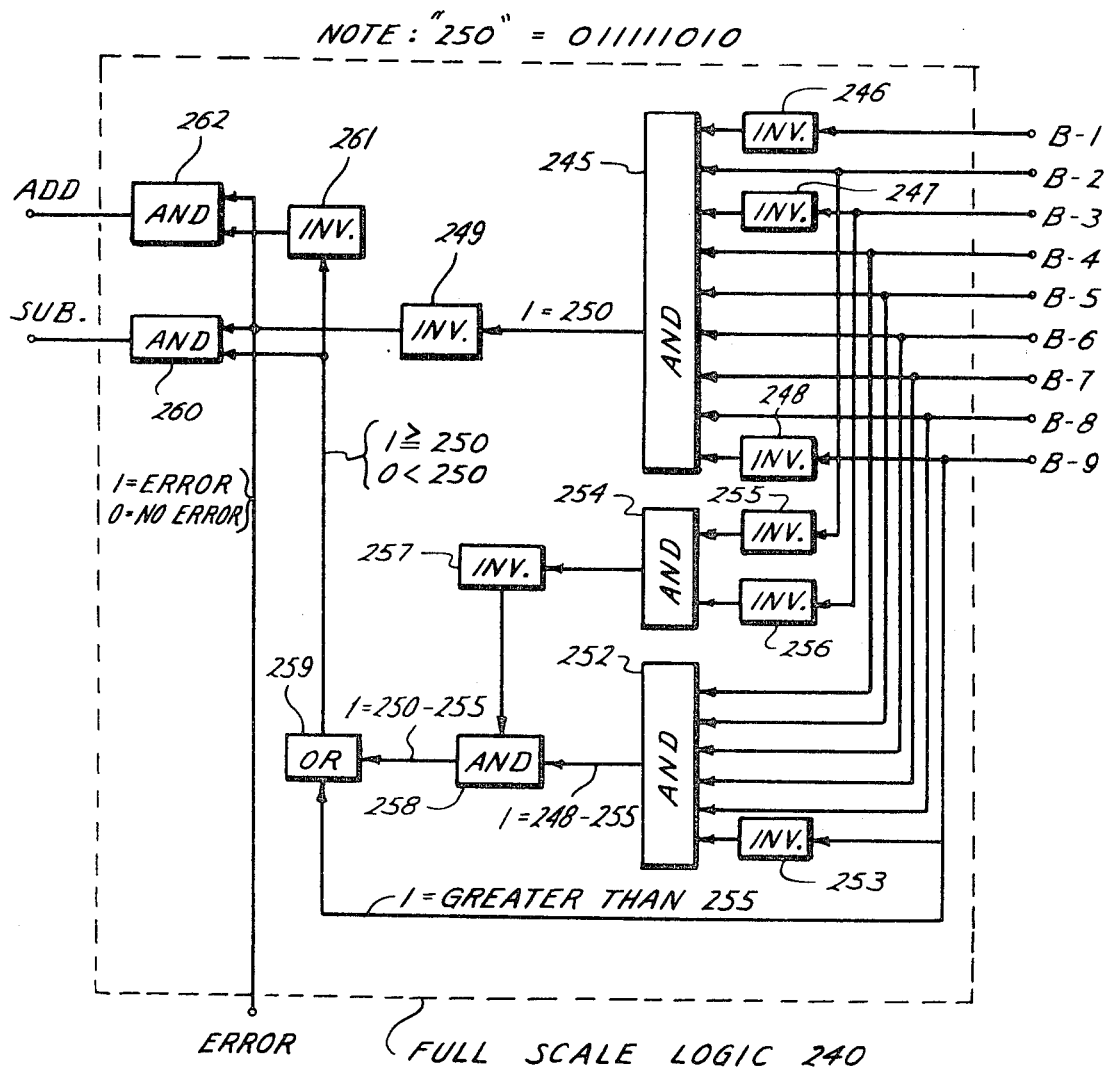
FIG. 21 shows the full-scale logic portion of the FIG. 18 converter.

The details of the full-scale logic circuits 240 are shown in FIG. 21. The existence of a correct "250" value is detected by a multiple-input AND circuit 245. Note that in a 9-bit binary code the number "250" is represented as "011111010," with the least significant bit on the right. The least significant bit is the B-1 bit. Thus, with the aid of inverter circuits 246, 247 and 248, all inputs to the AND circuit 245 will be at the "one" level when bits B-1 through B-9 are representing the number 250. This produces a one level output from AND circuit 245 which indicates the existence of a correct full-scale value. This one level is inverted to a zero level by inverter 249 so that at the output of the inverter 249, a zero level represents "no error" while a one level represents that the full-scale value is in error.

The remainder of the circuits determine the sense of the error. In particular, the AND circuit 252 is set to provide a one level output indication whenever the input value lies in the range from a count of 248 through a count of 255. During this interval, bits B-4 through B-8 will be at the one level, while the overflow bit B-9 is at the zero level. This zero level is inverted by inverter 253. Another AND circuit 254 is used to narrow the indicated range. In particular, for the counts of 248 and 249, bits B-2 and B-3 will be at the zero level. These zeros are inverted by inverters 255 and 256 so that AND circuit 254 produces a one level output for the counts 248 and 249. This one level is inverted by inverter circuit 257 so that the output thereof will be at the zero level during the occurrence of counts 248 and 249. This zero level serves to disable an AND gate 258 so that the output from AND gate 258 can be at the one level only for count values of 250 through 255. This one level from the AND gate 258 is supplied to a first input of an OR gate 259. A second input of OR circuit 259 is connected to the B-9 overflow bit line. The overflow bit B-9 will have a zero value whenever the count value is less than 256 and will have a one value whenever the count value is equal to or greater than 256. Thus, because of the two inputs to the OR circuit 259, the output level of this OR circuit is at the one level whenever the full-scale count is equal to or greater than 250. This one level indication is used to activate an AND circuit 260 which, in turn, supplies the "subtract" command to the full-scale bi-directional counter 242 (FIG. 18). This command will not be issued when the count is exactly equal to "250" because the second input to AND circuit 260 will be at a zero value for this count. For any count value greater than 250, however, the subtract command will be given.

The signal level at the output of OR circuit 259 is inverted by an inverter circuit 261 so as to drive an AND circuit 262 in the opposite manner from the AND circuit 260. In other words, AND circuit 262 will be activated by the signal from inverter 261 whenever the count value is less than 250. If the second input to AND circuit 262 is receiving the instruction that the count value is in error, i.e., not equal to "250," then the AND circuit 262 issues the "add" command to the full-scale bi-directional counter 242.

DISPLAY CHANNELS

Returning to FIG. 1, it is seen that the 8-bit binary code value on the 8 parallel lines forming the output of converter 200 are supplied in parallel to two sets of display channels 270 and 271. Each of the sets of display channels contains 16 individual and identical display channels. Actually the present apparatus can handle up to 128 display channels and, where more than the 32 illustrated channels are required, additional sets of 16 channels can be connected in a similar fashion. By packaging the display channels in sets of 16, the user of the apparatus is not required to have an excessive number of display channel circuits where only a limited number of signal channels are of interest.

The details of the 16 display channels 270 are shown in FIG. 22. For sake of simplicity, only display channel Nos. 1, 2 and 16 are shown in detail, the location of the remainder of the channels being indicated in a dotted-line fashion. The eight binary code bits are supplied to the inputs of each of the display channels in a parallel manner. Considering first display channel No. 1, the eight code bits are initially applied to the inputs of eight separate transfer gates 272a. Whenever the proper transfer command is received on the display channel transfer line $D_1$, these eight binary code bits will be transferred to an 8-bit storage register 273a. A differentiating circuit 274a assists in the transfer operation by resetting to zero any stage of the storage register 273a which does not receive a new "one" level pulse during the transfer operation. An indication of the contents of the storage register 273a is continuously provided by a binary display 275a. In addition, the binary code values in the storage register 273a can also be supplied to a digital data processing system where further processing of the signals is required for evaluation or other purposes. The contents of the storage register 273a are also applied to a binray-to analog converter 276a. As a result, a continuous analog representation of the binary value for one of the signal channels is provided by an analog device such as a meter 277a. Instead, or in addition to a meter presentation, the analog signal can be used to drive a suitable signal recording apparatus. The remainder of the display channels are identical to display channel No. 1, the various portions thereof being designated by the suffixes b, c, etc.

Which signal channel values are applied to the different ones of the display channels is determined by the occurrence of the transfer command pulses on the channel transfer lines $D_1$, $D_2$, etc. These display channel transfer commands are obtained from the plugboard 97 by way of 16 separate transfer gates 280 contained within the display channel unit 270. The details of the plugboard 97 are shown in FIG. 23. As there shown, and with further reference to FIG. 1, it is seen that the 128 channel gate lines from the timing circuits 85 are connected to 128 plugboard sockets designated as $C_1$, $C_2$, $C_3$, etc. The plugboard 97 includes a second set of 128 sockets designated as $D_1$, $D_2$, $D_3$, etc. These second sockets are wired to the transfer gates in the various display channel units. For example, sockets $D_1$–$D_{16}$ are wired to the transfer gates 280 of the display channel unit 270, as shown in FIG. 22. By means of appropriate jumper wires, the various channel gates $C_1$, $C_2$, $C_3$, etc., may be connected to any desired ones of the display channel lines $D_1$, $D_2$, $D_3$, etc. For example, as shown in FIG. 23, jumper wires 282 and 283 connect channel gates $C_3$ and $C_4$ to display channel lines $D_1$ and $D_2$, respectively. In this case, display channel No. 1 will provide an indication of the contents of signal channel $C_3$, while display channel No. 2 will provide an indication of the contents of signal channel $C_4$ of the multiplex pulse train.

The channel gates $C_1$, $C_2$, $C_3$, etc. are not applied directly to the display channel transfer gates 272a, 272b, etc., but are instead supplied by way of transfer gates 280 so that whether these channel gates are actually effective to produce a transfer action will be under the control of the TR–3X transfer command pulse. This TR–3X transfer command pulse will be present for each signal channel unless the phase synchronizer 90 of the timing circuits 85 provides an indication that the channel pulse is missing. In this case of a missing channel pulse, the corresponding channel gate will not be passed by the transfer gates 280 so that the intended display channel will simply hold its previous signal value.

CONCLUSIONS

From the foregoing description of the present embodiment of the invention, it is seen that a telemetering decoder system constructed in accordance with the present invention enables a variety of different types of time multiplexed pulse signals to be decoded. The decoder of the present invention can handle a wide range of channel rates and a wide range of channels numbers or channels per frame. Thus the present system provides a high degree of flexibility. Also, any changes in the multiplexed signal programming are readily handled by the present decoder system.

While there has been described what is at present considered to be a preferred embodiment of this invention, it will be obvious to those skilled in the art that various changes and modifications may be made therein without departing from the invention and it is, therefore, intended to cover all such changes and modifications as fall within the true spirit and scope of the invention.

What is claimed is:

1. In a telemetering decoder system for decoding a pulse train composed of repetitive cycles of time-multiplexed signal intervals where one signal interval of each cycle contains an indication of a full-scale signal value, the combination comprising: circuit means for supplying the pulse train; counting circuit means responsive to the pulse value during each signal interval for developing a plural-bit pulse code signal representative thereof; circuit means for examining the full-scale pulse code signals and for adjusting the counting rate of the counting circuit means if such signals depart from a desired predetermined full-scale value; and circuit means coupled to the counting circuit means for utilizing the pulse code signals developed thereby.

2. In a telemetering decoder system for decoding a pulse train composed of repetitive cycles of time-multiplexed signal intervals where one signal interval of each cycle contains an indication of a zero-scale signal value, the combination comprising: circuit means for supplying the pulse train; counting circuit means responsive to the pulse value during each signal interval for developing a plural-bit pulse code signal representative thereof; circuit means for examining the zero-scale pulse code signals and for adjusting the initial count condition of the counting circuit means if such signals depart from a desired predetermined zero-scale value; and circuit means coupled to the counting circuit means for utilizing the pulse code signals developed thereby.

3. In a telemetering decoder system for decoding a pulse train composed of repetitive cycles of time-multiplexed signal intervals where one signal interval of each cycle contains an indication of a full-scale signal value and another interval of each cycle contains an indication of a zero-scale signal value, the combination comprising: circuit means for supplying the pulse train; counting circuit means responsive to the pulse value during each signal interval for developing a plural-bit pulse code signal representative thereof; circuit means for examining the full-scale pulse code signals and for adjusting the counting rate of the counting circuit means if such signals depart from a desired predetermined full-scale value; circuit means for examining the zero-scale pulse code signals and for adjusting the initial count condition of the counting circuit means if such signals depart from a desired predetermined zero-scale value; and circuit means coupled to the counting circuit means for utilizing the pulse code signals developed thereby.

4. In a telemetering decoder system for decoding a pulse train composed of repetitive cycles of time-multiplexed signal channels where one signal channel of each cycle contains an indication of a full-scale signal value and another channel of each cycle contains an indication of a zero-scale signal value, the combination comprising: circuit means for supplying the pulse train; oscillator circuit means for generating pulses at a rate many times greater than the pulse train channel rate; a plural-stage pulse counter; circuit means responsive to the pulse value during each signal interval for enabling the oscillator circuit means to supply to the pulse counter a number of pulses which is representative of such pulse value; circuit means coupled to the pulse counter for utilizing the plural-bit pulse code signals developed thereby; circuit means for resetting the pulse counter to an initial count condition intermediate the intervals when pulses are supplied thereto by the oscillator circuit means; and circuit means coupled to the pulse counter for examining the pulse code signals produced for the full-scale signal channels and for adjusting the pulse rate of the oscillator circuit means if such signals depart from a desired predetermined full-scale value.

5. In a telemetering decoder system for decoding a pulse train composed of repetitive cycles of time-multiplexed signal channels where one signal channel of each cycle contains an indication of a full-scale signal value and another channel of each cycle contains an indication of a zero-scale signal value, the combination comprising: circuit means for supplying the pulse train; oscillator circuit means for generating pulses at a rate many times greater than the pulse train channel rate; a plural-stage pulse counter; circuit means responsive to the pulse value during each signal interval for enabling the oscillator circuit means to supply to the pulse counter a number of pulses which is representative of such pulse value; circuit means coupled to the plural-stage pulse counter for utilizing the plural-bit pulse code signals developed thereby; circuit means for resetting the plural-stage pulse counter to an initial count condition intermediate the intervals when pulses are supplied thereto by the oscillator circuit means, a bi-directional pulse counter; a binary-to-analog converter coupled between the bi-directional counter and the oscillator circuit means for adjusting the oscillator pulse rate in acordance with the count value in the bi-directional counter; and binary logic circuit means coupled to the plural-stage pulse counter and responsive to the pulse code signals produced for the full-scale signal channels for adjusting the count in the bi-directional counter such that the oscillator pulse rate is increased if the full-scale pulse code signal is less than a desired predetermined full-scale value and is decreased if the full-scale signal is greater than the desired value.

6. In a telemetering decoder system for decoding a pulse train composed of repetitive cycles of time-multiplexed signal channels where one signal channel of each cycle contains an indication of a full-scale signal value and another channel of each cycle contains an indication of a zero-scale signal value, the combination comprising: circuit means for supplying the pulse train; oscillator circuit means for generating pulses at a rate many times greater than the pulse train channel rate; a plural-stage pulse counter; circuit means responsive to the pulse value during each signal interval for enabling the oscillator circuit means to supply to the pulse counter a number of pulses which is representative of such pulse value; circuit means coupled to the pulse counter for utilizing the plural-bit pulse code signals developed thereby; circuit means for resetting the pulse counter to an initial count condition intermediate the intervals when pulses are supplied thereto by the oscillator circuit means; and circuit means coupled to the pulse counter for examining the pulse code signals produced for the zero-scale signal channels and for adjusting the initial count condition of the pulse counter if such signals depart from a desired predetermined zero-scale value.

7. In a telemetering decoder system for decoding a pulse train composed of repetitive cycles of time-multiplexed signal channels where one signal channel of each cycle contains an indication of a full-scale signal value and another channel of each cycle contains an indication of a zero-scale signal value, the combination comprising: circuit means for supplying the pulse train; oscillator circuit means for generating pulses at a rate many times greater than the pulse train channel rate; a plural-stage counter; circuit means responsive to the pulse value during each signal interval for enabling the oscillator circuit means to supply to the pulse counter a number of pulses which is representative of such pulse value; circuit means coupled to the plural-stage pulse counter for utilizing the plural-bit pulse code signals developed thereby; a bi-directional pulse counter; circuit means operative intermediate the intervals when pulses are being supplied by the oscillator circuit means for resetting the plural-stage pulse counter to an initial count condition corresponding to the count value in the bi-directional counter; and binary logic circuit means coupled to the plural-stage pulse counter and responsive to the pulse code signals produced for the zero-scale signal channels for adjusting the count in the bi-directional counter such that the initial count condition for the plural-stage counter is increased if the zero-scale pulse code signal is less than a desired predetermined zero-scale value and is decreased if the zero-scale signal is greater than the desired value.

8. In a telemetering decoder system for decoding a pulse train composed of repetitive cycles of time-multiplexed signal channels where one signal channel of each cycle contains an indication of a full-scale signal value and another channel of each cycle contains an indication of a zero-scale signal value, the combination comprising: circuit means for supplying the pulse train; oscillator circuit means for generating pulses at a rate many times greater than the pulse train channel rate; a plural-stage pulse counter; circuit means responsive to the pulse value during each signal interval for enabling the oscillator circuit means to supply to the pulse counter a number of pulses which is representative of such pulse value; circuit means coupled to the pulse counter for utilizing the plural-bit pulse code signals developed thereby; circuit means for resetting the pulse counter to an initial count condition intermediate the intervals when pulses are supplied thereto by the oscillator circuit means; circuit means coupled to the pulse counter for examining the pulse code signals produced for the full-scale signals channels and for adjusting the pulse rate of the oscillator circuit means if such signals depart from a desired predetermined full-scale value; and circuit means coupled to the pulse counter for examining the pulse code signals produced for the zero-scale signal channels and for adjusting the initial count condition of the pulse counter if such signals depart from a desired predetermined zero-scale value.

9. In a telemetering decoder system for decoding a train of duration modulated pulses representing repetitive cycles of time-multiplexed signal channels where the duration modulation of one signal channel of each cycle represents a full-scale signal value and the duration modulation of another channel of each cycle represents a zero-scale signal value, the combination comprising: circuit means for supplying the duration modulated pulse train; oscillator circuit means for generating pulses at a rate many times greater than the pulse train channel rate; a plural-stage pulse counter; circuit means responsive to the pulse duration during each signal interval for enabling the oscillator circuit means to supply to the pulse counter a number of pulses which is representative of such pulse duration; circuit means coupled to the pulse counter for utilizing the plural-bit pulse code signals developed thereby; circuit means for resetting the pulse counter to an initial count condition intermediate the intervals when pulses are supplied thereto by the oscillator circuit means; circuit means coupled to the pulse ocunter for examining the pulse code signals produced for the full-scale signal channels and for adjusting the pulse rate of the oscillator circuit means if such signals depart from a desired predetermined full-scale value; and circuit means coupled to the pulse counter for examining the pulse code signals produced for the zero-scale signal channels and for adjusting the initial count condition of the pulse counter if such signals depart from a desired predetermined zero-scale value.

10. In a telemetering decoder system for decoding a pulse train composed of repetitive cycles of time-multiplexed signal channels where on signal channel of each cycle contains an indication of a full-scale signal value and another channel of each cycle contains an indication of a zero-scale signal value, the combination comprising: circuit means for supplying the pulse train; oscillator circuit means for generating pulses at a rate many times greater than the pulse train channel rate; a plural-stage pulse counter; circuit means responsive to the pulse value during each signal interval for enabling the oscillator circuit means to supply to the pulse counter a number of pulses which is representative of such pulse value; circuit means coupled to the pulse counter for utilizing the plural-bit pulse code signals developed thereby; circuit means operative intermediate the intervals when pulses are being supplied by the oscillator circuit means for resetting the pulse counter to an initial count condition corresponding to the complement-plus-one value of the zero-scale value; and circuit means coupled to the pulse counter for exmaining the pulse code signals produced for the zero-scale signal channels and for adjusting the initial count condition to which the pulse counter is reset if such signals depart from a value of zero.

11. In a telemetering decoder system for decoding a pulse train composed of repetitive frames of time-multiplexed signal channels, a timing system for generating decoder timing pulses comprising: circuit means for supplying the pulse train; a free-running clock-pulse generator for generating clock pulses; frequency synchronizer circuit means responsive to both the pulse train and the generated lock pulses for maintaining a desired relationship between the clock pulse rate and the pulse train channel rate; a plural-stage binary counter for counting the generated clock pulses; phase synchronizer circuit means responsive to the pulse train for synchronizing the recycling of the binary counter with the occurrence of the pulse train channel intervals; and circuit means coupled to the binary counter for developing timing pulses for the remainder of the telemetering decoder system.

12. In a telemetering decoder system for decoding a pulse train composed of repetitive frames of time-multiplexed signal channels, a timing system for generating decoder timing pulses comprising: circuit means for supplying the pulse train; a clock-pulse generator for generating clock pulses at a rate which is a predetermined number of times greater than the pulse train channel rate; frequency synchronizer circuit means responsive to both the pulse train and the generated clock pulses for maintaining the desired relationship between the clock rate and the channel rate; a plural-stage binary counter for counting the generated clock pulses; phase synchronizer circuit means responsive to the pulse train for synchronizing the recycling of the binary counter with the occurrence of the pulse train channel intervals; and circuit means coupled to the binary counter for developing separate sets of channel-rate timing pulses corresponding to different positions within the channel intervals, these channel-rate timing pulses being useful in controlling the remainder of the telemetering decoder system.

13. In a telemetering decoder system for decoding a pulse train composed of repetitive frames of time-multiplexed signal channels, a timing system for generating decoder timing pulses comprising: circuit means for supplying the pulse train; a clock-pulse generator for generating clock pulses at a rate which is a predetermined number of times greater than the pulse train channel rate; frequency synchronizer circuit means responsive to both the pulse train and the generated clock pulses for maintaining the desired relationship between the clock rate and the channel rate; a plural-stage binary counter for counting the generated clock pulses and having a counting capacity corresponding to the desired ratio of the clock rate to the channel rate; phase synchronizer circuit means responsive to the pulse train for synchronizing the recycling of the binary counter with the leading edges of the pulse train channel intervals; and circuit means coupled to the binary counter for devleoping separate sets of channel-rate timing pulses corresponding to different positions within the channel intervals, these channel-rate timing pulses being useful in controlling the remainder of the telemetering decoder system.

14. In a telemetering decoder system for decoding a pulse train composed of repetitive frames of time-multiplexed signal channels, a timing system for generating decoder timing pulses comprising: circuit means for supplying the pulse train; a clock-pulse generator for generating clock pulses at a rate which is a predetermined number of times greater than the pulse train channel rate; a bi-directional pulse counter; a binary-to-analog converter coupled between the bi-directional counter and the clock-pulse generator for adjusting the clock pulse rate in accordance with the count value in the bi-directional counter; a first plural-stage binary counter; gating circuit means coupled to the clock-pulse generator and responsive to the pulse train for supplying clock pulses to the plural-stage binary counter for a time interval corresponding to at least one pulse train channel interval; binary logic circuit means coupled to the plural-stage binary counter for adjusting the count in the bi-directional counter if the number of clock pulses per channel interval differs from the desired ratio of the clock rate to the channel rate; a second plural-stage binary counter for counting the generated clock pulses; phase synchronizer circuit means responsive to the pulse train for synchronizing the recycling of the second plural-stage binary counter with the occurrence of the pulse train channel intervals; and circuit means coupled to the second binary counter for developing separate sets of channel-rate timing pulses corresponding to different positions within the channel intervals, these channel-rate timing pulses being useful in controlling the remainder of the telemetering decoder system.

15. In a telemetering decoder system for decoding a pulse train composed of repetitive frames of time-multiplexed signal channels and including a synchronizing pulses pattern for each frame, a timing system for generating decoder timing pulses comprising: circuit means for supplying the pulse train; a clock-pulse generator for generating clock pulses at a rate which is a predetermined number of times greater than the pulse train channel rate; frequency synchronizer circuit means responsive to both the pulse train and the generated clock pulses for maintaining the desired relationship between the clock rate and the channel rate; a first plural-stage binary counter for counting the generated clock pulses; phase synchronizer circuit means responsive to the pulse train for synchronizing the recycling of the first binary counter with the occurrence of the pulse train channel intervals; circuit means coupled to the first binary counter for developing separate sets of channel-rate timing pulses corresponding to different positions within the channel intervals; a second plural-stage binary counter for counting one set of channel-rate timing pulses; frame synchronizer circuit means responsive to the pulse train for synchronizing the recycling of the second binary counter with the occurrence of the synchronizing pulse patterns in the pulse train; and circuit means coupled to the second binary counter for developing separate sets of frame-rate timing pulses corresponding to different channels within the frame intervals, these frame-rate timing pulses, as well as the channel-rate timing pulses, being useful in controlling the remainder of the telemetering decoder system.

16. In a telemetering decoder system for decoding a pulse train composed of repetitive frames of time-multiplexed signal channels and including a synchronizing pulse pattern for each frame, a timing system for generating decoder timing pulses comprising: circuit means for supplying the pulse train; a clock-pulse generator for generating clock pulses at a rate which is a predetermined number of times greater than the pulse train channel rate; frequency synchronizer circuit means responsive to both the pulse train and the generated clock pulses for maintaining the desired relationship between the clock rate and the channel rate; a first plural-stage binary counter for counting the generated clock pulses and having a counting capacity corresponding to the desired ratio of the clock rate to the channel rate; phase synchronizer circuit means responsive to the pulse train for synchronizing the recycling of the first binary counter with the occurrence of the pulse train channel intervals; circuit means coupled to the first binary counter for developing separate sets of channel-rate timing pulses corresponding to different positions within the channel intervals; a second plural-stage binary counter for counting one set of channel-rate timing pulses and having a counting capacity corresponding to the number of pulse train channels per frame; frame synchronizer circuit means responsive to the pulse train for synchronizing the recycling of the second binary counter with the occurrence of the synchronizing pulse patterns in the pulse train; and circuit means coupled to the second binary counter for developing separate sets of frame-rate timing pulses corresponding to different channels within the frame intervals, these frame-rate timing pulses, as well as the channel-rate timing pulses, being useful in controlling the remainder of the telemetering decoder system.

17. In a telemetering decoder system for decoding a pulse train composed of repetitive frames of time-multiplexed signal channels and including a synchronizing pulse pattern for each frame, a timing system for generating decoder timing pulses comprising: circuit means for supplying the pulse train; a clock-pulse generator for generating clock pulses at a rate which is a predetermined number of times greater than the pulse train channel rate; frequency synchronizer circuit means responsive to both the pulse train and the generated clock pulses for maintaining the desired relationship between the clock rate and the channel rate; a first plural-stage binary counter for counting the generated clock pulses; phase synchronizer circuit means responsive to the pulse train for synchronizing the recycling of the first binary counter with the occurrence of the pulse train channel intervals; circuit means coupled to the first binary counter for developing separate sets of channel-rate timing pulses corresponding to different positions within the channel intervals; a second plural-stage binary counter for counting one set of channel-rate timing pulses; recycle circuit means coupled to the second binary counter for returning this counter to a zero count condition upon the occurrence of a predetermined count therein, this predetermined count corresponding to the number of pulse train channels per frame; frame synchronizer circuit means responsive to the pulse train for synchronizing the recycling of the second binary counter with the occurrence of the synchronizing pulse patterns in the pulse train; and circuit means coupled to the second binary counter for developing separate sets of frame-rate timing pulses corresponding to different channels within the frame intervals, these frame-rate timing pulses, together with the channel-rate timing pulses, being useful in controlling the remainder of the telemetering decoder system.

18. A synchronizing system for synchronizing a clock-pulse generator operating at one frequency with a time-multiplexed pulse train having pulse intervals occurring at a second frequency comprising: circuit means for supplying the pulse train; a clock-pulse generator for generating clock pulses at a rate which is a predetermined number of times greater than the pulse interval rate of the pulse train; a bi-directional pulse counter; a binary-to-analog converter coupled between the bi-directional counter and the clock-pulse generator for adjusting the clock pulse rate in accordance with the count value in the bi-directional counter; a plural-stage binary counter; gating circuit means coupled to the clock-pulse generator and responsive to the pulse train for supplying clock pulses to the plural-stage binary counter for a time interval corresponding to at least one pulse train pulse interval; and binary logic circuit means coupled to the plural-stage binary counter for adjusting the count in the bi-directional counter if the number of clock pulses per pulse train interval differs from the desired ratio of the clock pulse rate to the pulse train interval rate.

References Cited
UNITED STATES PATENTS 3,069,568  12/1962  Day _____ 328—155 XR
3,109,143  10/1963  Gluth _____ 325—320

DONALD J. YUSKO, Primary Examiner

U.S. Cl. X.R.

340—168